United States Patent
Odaira et al.

(10) Patent No.: US 11,965,830 B2
(45) Date of Patent: Apr. 23, 2024

(54) DATA ACQUISITION APPARATUS

(71) Applicant: Evident Corporation, Nagano (JP)

(72) Inventors: Mayumi Odaira, Akiruno (JP); Yoshimasa Suzuki, Kawasaki (JP)

(73) Assignee: Evident Corporation, Nagano (JP)

( * ) Notice: Subject to any disclaimer, the term of this patent is extended or adjusted under 35 U.S.C. 154(b) by 846 days.

(21) Appl. No.: 17/084,717

(22) Filed: Oct. 30, 2020

(65) Prior Publication Data

US 2021/0048387 A1 Feb. 18, 2021

Related U.S. Application Data

(63) Continuation of application No. PCT/JP2018/017542, filed on May 2, 2018.

(51) Int. Cl.
*G01N 21/41* (2006.01)
*G01N 21/45* (2006.01)
*G02B 26/10* (2006.01)
*G02B 27/10* (2006.01)

(52) U.S. Cl.
CPC ......... *G01N 21/4133* (2013.01); *G01N 21/45* (2013.01); *G02B 26/105* (2013.01); *G02B 27/1013* (2013.01); *G01N 2201/063* (2013.01)

(58) Field of Classification Search
None
See application file for complete search history.

(56) References Cited

U.S. PATENT DOCUMENTS

| | | | |
|---|---|---|---|
| 5,671,085 A | 9/1997 | Gustafsson et al. | |
| 6,552,799 B1 | 4/2003 | Wright et al. | |

(Continued)

FOREIGN PATENT DOCUMENTS

| | | | |
|---|---|---|---|
| JP | 2001-228123 A | 8/2001 | |
| JP | 2009-223348 A | 10/2009 | |

(Continued)

OTHER PUBLICATIONS

International Preliminary Report on Patentability dated Nov. 12, 2020 together with the Written Opinion issued in International Application No. PCT/JP2018/017542.

(Continued)

*Primary Examiner* — Bao-Luan Q Le
*Assistant Examiner* — Danell L Owens
(74) *Attorney, Agent, or Firm* — Scully, Scott, Murphy & Presser, P.C.

(57) ABSTRACT

A data acquisition apparatus includes a light source, a first beam splitter, a predetermined beam splitter, a first light deflector, a second light deflector, a first measuring unit, a second measuring unit, a second beam splitter, and a photodetector. A second measurement optical path is positioned in a first direction and a reference optical path is positioned in a second direction. The predetermined beam splitter is disposed in the second measurement optical path or the reference optical path. A first measurement optical path is positioned between the predetermined beam splitter and the photodetector. The first light deflector and the first measuring unit are disposed in the first measurement optical path, and the second light deflector and the second measuring unit are disposed in the second measurement optical path. The first measurement optical path and the second measurement optical path intersect.

14 Claims, 20 Drawing Sheets

(56) References Cited

U.S. PATENT DOCUMENTS

| | | | |
|---|---|---|---|
| RE38,307 E | 11/2003 | Gustafsson et al. | |
| 8,908,186 B2 | 12/2014 | Huntley et al. | |
| 8,937,722 B2 | 1/2015 | Cotte et al. | |
| 10,209,056 B2 | 2/2019 | Yamauchi et al. | |
| 10,215,697 B2 | 2/2019 | Park et al. | |
| 2012/0176625 A1 | 7/2012 | Huntley et al. | |
| 2014/0307249 A1 | 10/2014 | Peremans et al. | |
| 2015/0176966 A1* | 6/2015 | Eguchi | G03H 1/0443 356/457 |
| 2017/0023471 A1 | 1/2017 | Park et al. | |
| 2017/0356735 A1 | 12/2017 | Yamauchi et al. | |

FOREIGN PATENT DOCUMENTS

| | | |
|---|---|---|
| JP | 2012-533746 A | 12/2012 |
| JP | 2013-145199 A | 7/2013 |
| JP | 2017-26596 A | 2/2017 |
| WO | WO 2016/121248 A1 | 8/2016 |
| WO | WO 2018/049476 A1 | 3/2018 |

OTHER PUBLICATIONS

Chinese Office Action dated Mar. 31, 2023 received in 201880093010.0.

International Search Report and Written Opinion dated Sep. 18, 2018 issued in PCT/JP2018/017542.

Kamilov, Ulugbek S. et al., "Learning approach to optical tomography", Optica (Jun. 2015), vol. 2, No. 6, pp. 517-522, cited in spec on p. 1.

* cited by examiner ated from the scattering potential.

DATA ACQUISITION APPARATUS

CROSS-REFERENCE TO RELATED APPLICATION

The present application is a continuation application of International Application No. PCT/JP2018/017542 filed on May 2, 2018, the entire contents of which are incorporated herein by reference.

BACKGROUND

Technical Field

The present disclosure relates to a data acquisition apparatus, and particularly to an apparatus which acquires data used for calculating a refractive index.

Description of the Related Art

An apparatus which acquires an image of a micro object with a high resolution has been disclosed in an article "Learning approach to optical tomography" by ULUGBEK S. KAMILOV ET AL, in Optica of June 2015, Vol. 2, No. 6, 517-522, and U.S. Pat. No. 8,937,722.

In "Learning approach to optical tomography", the apparatus has a reference optical path and a signal optical path. A lens is disposed in the reference optical path. Two objective lenses are disposed in the signal optical path. The two objective lenses are disposed across a sample. A rotating mirror is disposed in the signal optical path. By the rotating mirror, an angle of light irradiated onto the sample changes.

Light passed through the sample is detected by a photodetector together with light of the reference optical path. A hologram is formed by the light passed through the sample and the light of the reference optical path. The light passed through the sample includes scattered light generated in the sample. Therefore, information of the scattered light is included in the hologram as well. A three-dimensional distribution of a refractive index in the sample is calculated by using the hologram.

In U.S. Pat. No. 8,937,722, an apparatus has two optical paths. A pin hole and a lens are disposed in one optical path. A condenser lens and an objective lens are disposed in the other optical path. The condenser lens and the objective lens are disposed across a sample. A wedge prism is disposed in the signal optical path. By rotation of the wedge prism, an angle of light irradiated onto the sample changes.

In U.S. Pat. No. 8,937,722, a method of improving a resolution of an image of a micro object is disclosed. The method disclosed includes a step of measuring a wave field scattered in the micro object. A scattering potential is calculated by deconvolving the wave field measured with a coherent transfer function. The resolution of the image is improved by calculating the scattering potential for each angle of light irradiated onto the sample and combining at a Fourier plane.

Moreover, expression (30) is disclosed. Expression (30) includes a function F(K) and n(r). The function F(K) is the scattering potential and n(r) is a complex refractive index. Expression (30) indicates that the refractive index is calcu-

SUMMARY

A data acquisition apparatus according to at least some embodiments of the present disclosure includes a light source,
a first beam splitter,
a predetermined beam splitter,
a first light deflector,
a second light deflector,
a first measuring unit,
a second measuring unit,
a second beam splitter, and
a photodetector, wherein
a first measurement optical path, a second measurement optical path, and a reference optical path are positioned between the light source and the photodetector,
each of the first beam splitter, the predetermined beam splitter, and the second beam splitter has an optical surface on which an optical film is formed,
at the first beam splitter, from an incident light, light travelling in a first direction and light travelling in a second direction are generated by the optical film,
the second measurement optical path is positioned in the first direction,
the reference optical path is positioned in the second direction,
the predetermined beam splitter is disposed in the second measurement optical path or the reference optical path,
the first measurement optical path is positioned between the predetermined beam splitter and the photodetector,
the first light deflector and the first measuring unit are disposed in the first measurement optical path,
the second light deflector and the second measuring unit are disposed in the second measurement optical path, and
the first measurement optical path and the second measurement optical path intersect.

DETAILED DESCRIPTION

Prior to the explanation of examples, action and effect of embodiments according to certain aspects of the present disclosure will be described below. In the explanation of the action and effect of the embodiments concretely, the explanation will be made by citing concrete examples. However, similar to a case of the examples to be described later, aspects exemplified thereof are only some of the aspects included in the present disclosure, and there exists a large number of variations in these aspects. Consequently, the present disclosure is not restricted to the aspects that will be exemplified.

A data acquisition apparatus of a first embodiment and a data acquisition apparatus of a second embodiment have a common arrangement. The common arrangement includes a light source, a first beam splitter, a predetermined beam splitter, a first light deflector, a second light deflector, a first measuring unit, a second measuring unit, a second beam splitter, and a photodetector. A first measurement optical path, a second measurement optical path, and a reference optical path are positioned between the light source and the photodetector. Each of the first beam splitter, the predetermined beam splitter, and the second beam splitter has an optical surface on which an optical film is formed. At the first beam splitter, from an incident light, light travelling in a first direction and light travelling in a second direction are generated by the optical film. The second measurement optical path is positioned in the first direction and the reference optical path is positioned in the second direction. The predetermined beam splitter is disposed in the second measurement optical path or the reference optical path, and the first measurement optical path is positioned between the predetermined beam splitter and the photodetector. The first light deflector and the first measuring unit are disposed in the first measurement optical path, and the second light deflector and the second measuring unit are disposed in the second measurement optical path, and the first measurement optical path and the second measurement optical path intersect.

Figure 1:
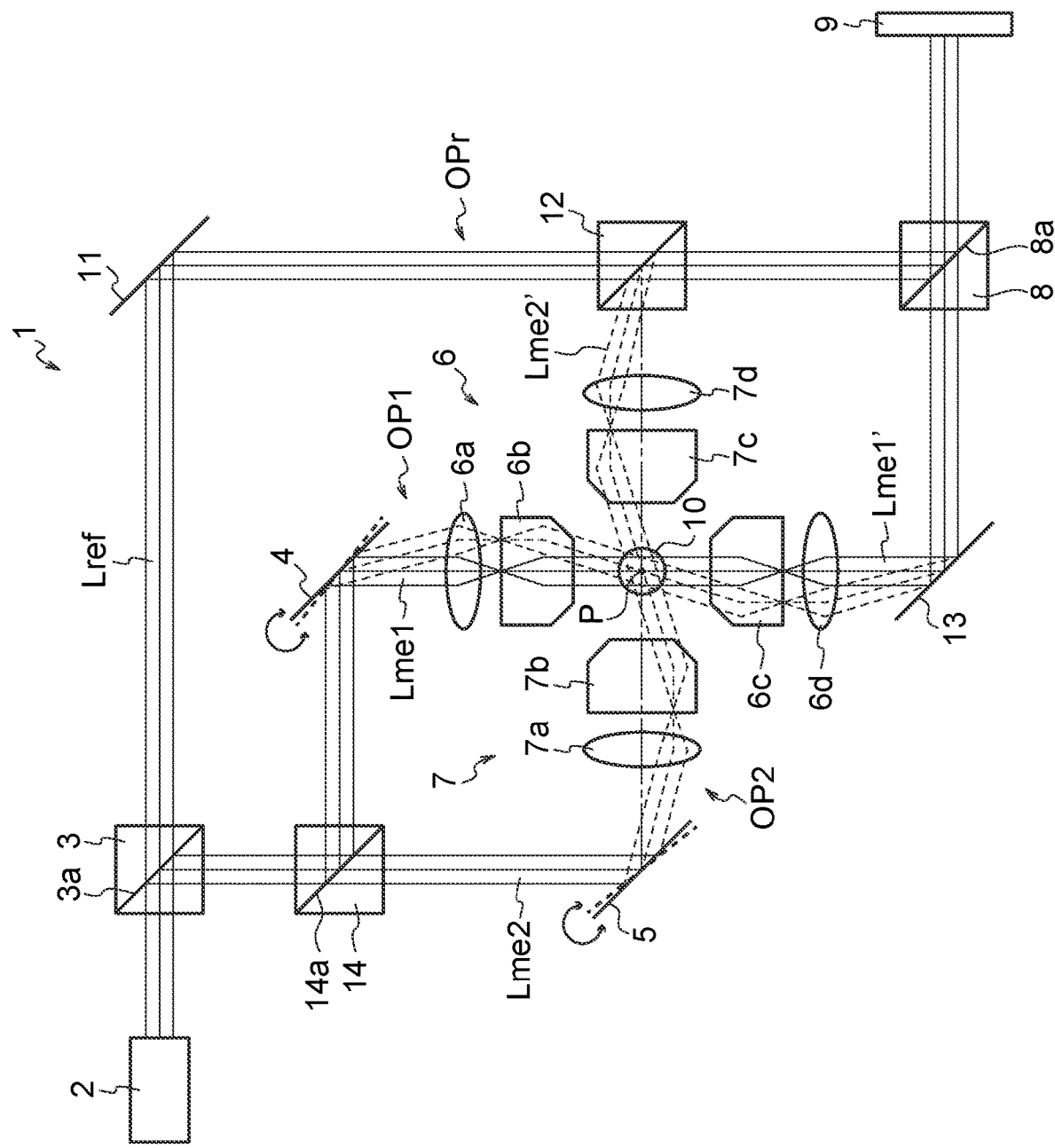
FIG. 1 is a diagram showing a data acquisition apparatus of a first embodiment.
Figure 2:
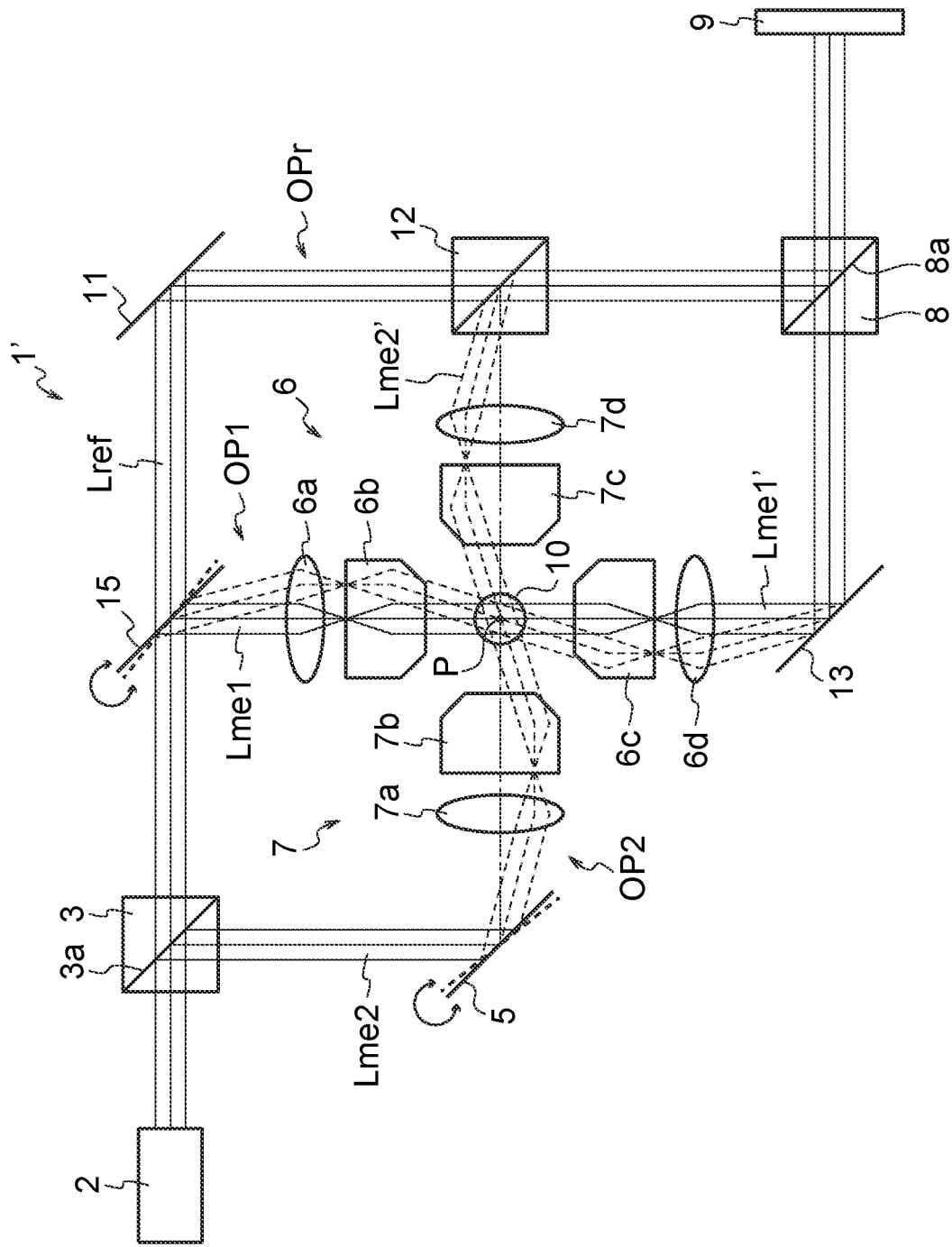
FIG. 2 is a diagram showing a data acquisition apparatus of a second embodiment.

The data acquisition apparatus of the first embodiment and the data acquisition apparatus of the second embodiment have a common arrangement. The common arrangement will be described below. The data acquisition apparatus of the first embodiment is shown in FIG. 1. The data acquisition apparatus of the second embodiment is shown in FIG. 2.

The data acquisition apparatus 1 and the data acquisition apparatus 1', as a common arrangement, include a light source 2, a first beam splitter 3, a first light deflector 4, a second light deflector 5, a first measuring unit 6, a second measuring unit 7, a second beam splitter 8, and a photodetector 9.

In the common arrangement, a first measurement optical path OP1, a second measurement optical path OP2, and a reference optical path OPr are positioned between the light source 2 and the photodetector 9.

The first beam splitter 3 has an optical surface 3a on which an optical film is formed. The second beam splitter 8 has an optical surface 8a on which an optical film is formed.

At the first beam splitter 3, from an incident light, light travelling in a first direction and light travelling in a second direction are generated by the optical film. Specifically, reflected light and transmitted light are generated by the optical film. In the data acquisition apparatus 1 and the data acquisition apparatus 1', the reflected light corresponds to the light travelling in the first direction and the transmitted light corresponds to the light travelling in the second direction.

The first direction and the second direction intersect. It is preferable that the first direction and the second direction be two directions that are orthogonal.

The second measurement optical path OP2 is positioned in the first direction. Therefore, the second measurement optical path OP2 is positioned on a reflection side of the first beam splitter 3. The reference optical path OPr is positioned in the second direction. Therefore, the reference optical path OPr is positioned on a transmission side of the first beam splitter 3.

In the description heretofore, the reflected light generated at the optical surface 3a is associated with the light travelling in the first direction. Moreover, the transmitted light generated at the optical surface 3a is associated with the light travelling in the second direction. Therefore, the second measurement optical path OP2 is positioned on the reflection side of the first beam splitter 3. The reference optical path OPr is positioned on the transmission side of the first beam splitter 3.

However, the reflected light generated at the optical surface 3a may be associated with the light travelling in the second direction. Moreover, the transmitted light generated at the optical surface 3a may be associated with the light travelling in the first direction. In this case, the reference optical path OPr is positioned on the reflection side of the first beam splitter 3. The second measurement optical path OP2 is positioned on the transmission side of the first beam splitter 3.

The common arrangement includes the predetermined beam splitter. The predetermined beam splitter is disposed in the second measurement optical path or disposed in the reference optical path.

The data acquisition apparatus 1 includes a predetermined beam splitter 14. The predetermined beam splitter 14 has an optical surface 14a on which an optical film is formed. At the predetermined beam splitter 14, from an incident light, reflected light and transmitted light are generated by the optical film.

In the data acquisition apparatus 1, the predetermined beam splitter 14 is positioned in the second measurement optical path OP2. Therefore, the predetermined beam splitter 14 is disposed on the reflection side of the first beam splitter 3.

The data acquisition apparatus 1' includes a predetermined beam splitter 15. The predetermined beam splitter 15 has an optical surface on which an optical film is formed. At the predetermined beam splitter 15, from an incident light, reflected light and transmitted light are generated by the optical film.

In the data acquisition apparatus 1', the predetermined beam splitter 15 is disposed in the reference optical path OPr. Therefore, the predetermined beam splitter 15 is disposed on the transmission side of the first beam splitter 3.

In the common arrangement, the first measurement optical path is positioned between the predetermined beam splitter and the photodetector.

In the data acquisition apparatus 1, the first measurement optical path OP1 is positioned between the predetermined beam splitter 14 and the photodetector 9. The predetermined beam splitter 14 is disposed on the reflection side of the first beam splitter 3. Therefore, the first measurement optical path OP1, similarly as the second measurement optical path OP2, is positioned on the reflection side of the first beam splitter 3.

In the data acquisition apparatus 1', the first measurement optical path OP1 is positioned between the predetermined beam splitter 15 and the photodetector 9. The predetermined beam splitter 15 is disposed on the transmission side of the first beam splitter 3. Therefore, the first measurement optical path OP1, similarly as the reference optical path OPr, is positioned on the transmission side of the first beam splitter 3.

In the common arrangement, the first light deflector 4 and the first measuring unit 6 are disposed in the first measurement optical path OP1. The first measuring unit 6 includes a first illuminating optical system and a first detecting optical system. The first illuminating optical system includes an imaging lens 6a and an objective lens 6b. The first detecting optical system includes an objective lens 6c and an imaging lens 6d.

The second light deflector 5 and the second measuring unit 7 are disposed in the second measurement optical path OP2. The second measuring unit 7 includes a second illuminating optical system and a second detecting optical system. The second illuminating optical system includes an imaging lens 7a and an objective lens 7b. The second detecting optical system includes an objective lens 7c and an imaging lens 7d.

The first measurement optical path OP1 and the second measurement optical path OP2 intersect. A sample 10 is positioned on a point of intersection P of the first measurement optical path OP1 and the second measurement optical path OP2. In the data acquisition apparatus 1 and the data acquisition apparatus 1', the first measurement optical path OP1 and the second measurement optical path OP2 are orthogonal.

In the first measuring unit 6, the first illuminating optical system and the first detecting optical system face each other across the point of intersection P. In the second measuring unit 7, the second illuminating optical system and the second detecting optical system face each other across the point of intersection P.

In the common arrangement, furthermore, a mirror 11, a beam splitter 12, and a mirror 13 may is disposed. The mirror 11 is disposed in the reference optical path OPr. The beam splitter 12 is disposed at a point where the second measurement optical path OP2 and the reference optical path OPr intersect. The mirror 13 is disposed in the first measurement optical path OP1.

It is preferable that the data acquisition apparatus of the first embodiment have the abovementioned basic arrangement, the predetermined beam splitter be disposed in the second measurement optical path, the first measurement optical path be positioned on a reflection side of the predetermined beam splitter, and the second measurement optical path be positioned on a transmission side of the predetermined beam splitter.

In the data acquisition apparatus 1, the predetermined beam splitter 14 is disposed in the second measurement optical path OP2. The first measurement optical path OP1 is positioned on the reflection side of the predetermined beam splitter 14. The second measurement optical path OP2 is positioned on the transmission side of the predetermined beam splitter 14.

The first light deflector 4 and the first measuring unit 6 are disposed in the first measurement optical path OP1. The second light deflector 5 and the second measuring unit 7 are disposed in the second measurement optical path OP2. Both an optical surface of the first light deflector 4 and an optical surface of the second light deflector 5 are mirror surfaces.

Illumination light is emitted from the light source 2. The illumination light enters the first beam splitter 3. At the first beam splitter 3, transmitted light and reflected light are generated from the illumination light. The transmitted light (hereinafter, referred to as a 'reference light Lref') travels in the second direction. The reflected light travels in the first direction.

The reference optical path OPr is positioned in the second direction, or in other words, on the transmission side of the first beam splitter 3. The reference light Lref travels along the reference optical path OPr. The mirror 11 and the beam splitter 12 are disposed in the reference optical path OPr.

The reference light Lref, after being reflected at the mirror 11, enters the beam splitter 12. The beam splitter 12 has an optical surface 12a on which an optical film is formed. At the beam splitter 12, from an incident light, reflected light and transmitted light are generated by the optical film.

At the beam splitter 12, a part of the reference light Lref is reflected by the optical film and the remaining light passes through the optical film. The reference light Lref passes through the beam splitter 12 enters the second beam splitter 8.

At the second beam splitter 8, from an incident light, reflected light and transmitted light are generated by the optical film. At the second beam splitter 8, a part of the reference light Lref is reflected by the optical film and the remaining light passes through the optical film. The reference light Lref reflected at the second beam splitter 8 enters the photodetector 9.

The predetermined beam splitter 14 is positioned in the first direction, or in other words, on the reflection side of the first beam splitter 3. The reflected light enters the predetermined beam splitter 14. The predetermined beam splitter 14 has the optical surface 14a on which the optical film is formed. Therefore, at the predetermined beam splitter 14, reflected light (hereinafter, referred to as 'measurement light Lme1') and transmitted light (hereinafter, referred to as 'measurement light Lme2') are generated.

The first light deflector 4 is disposed at a reflection side of the predetermined beam splitter 14. The measurement light Lme1 enters the first light deflector 4. The optical surface of the first light deflector 4 is a mirror surface. Therefore, the measurement light Lme1 is reflected at the first light deflector 4.

The first measurement optical path OP1 is positioned on the reflection side of the optical surface of the first light deflector 4. The measurement light Lme1 travels along the first measurement optical path OP1. The first measuring unit 6 and the mirror 13 are disposed in the first measurement optical path OP1.

The measurement light Lme1 enters the first measuring unit 6. The measurement light Lme1, after entering the imaging lens 6a, emerges from the objective lens 6b. The sample 10 is positioned between the objective lens 6b and the objective lens 6c. Therefore, the measurement light Lme1 is irradiated to the sample 10.

The measurement light Lme1 is deflected by the first light deflector 4. As a result, an angle of light irradiated onto the sample 10 changes.

The sample 10, for example, is a living cell. The living cell being colorless and transparent, the measurement light Lme1 passes through the sample 10. At this time, the measurement light Lme1 has an effect of the sample. As a result, scattered light emerges from the sample 10.

Measurement light including the scattered light (hereinafter, referred to as a 'measurement light Lme1''), after entering the objective lens 6c, emerges from the imaging lens 6d, and enters the mirror 13. The measurement light Lme1' is reflected at the mirror 13, and enters the second beam splitter 8.

At the second beam splitter 8, a part of the measurement light Lme1' is reflected by the optical film and the remaining light passes through the optical film. The measurement light Lme1' passed through the second beam splitter 8 enters the photodetector 9.

The second light deflector 5 is disposed on the transmission side of the predetermined beam splitter 14. The measurement light Lme2 enters the second light deflector 5. The optical surface of the second light deflector 5 is a mirror surface. Therefore, measurement light Lme2 is reflected at the second light deflector 5.

The second measurement optical path OP2 is positioned on the reflection side of the optical surface of the second light deflector 5. The measurement light Lme2 travels along the second measurement optical path OP2. The second light deflector 5 and the second measuring unit 7 are disposed in the second measurement optical path OP2.

The measurement light Lme2 enters the second measuring unit 7. The measurement light Lme2, after entering the imaging lens 7a, emerges from the objective lens 7b. The sample 10 is positioned between the objective lens 7b and the objective lens 7c. Therefore, the measurement light Lme2 is irradiated to the sample 10.

The measurement light Lme2 is deflected by the second light deflector 5. As a result, an angle of light irradiated onto the sample 10 changes.

The measurement light Lme2 passes through the sample 10. At this time, the measurement light Lme2 has an effect of the sample 10. As a result, scattered light emerges from the sample 10.

Measurement light including the scattered light (hereinafter, referred to as a 'measuring light Lme2''), after entering the objective lens 7c, emerges from the imaging lens 7d, and enters the beam splitter 12. At the beam splitter 12, a part of the measurement light Lme2' is reflected by the optical film and the remaining light passes through the optical film. The measurement light Lme2' reflected at the beam splitter 12 enters the second beam splitter 8.

At the second beam splitter 8, a part of the measurement light Lme2' is reflected by the optical film and the remaining light passes through the optical film. The measurement light Lme2' reflected at the second beam splitter 8 enters the photodetector 9.

The measurement light Lme1', the measurement light Lme2', and the reference light Lref enter the photodetector 9. A first interference fringe is formed by the measurement light Lme1' and the reference light Lref. A second interference fringe is formed by the measurement light Lme2' and the reference light Lref. As a result, it is possible to detect the first interference fringe and the second interference fringe.

However, when the measurement light Lme1' enters the photodetector 9, the measurement light Lme2' may be inhibited from entering the photodetector 9. Conversely, when the measurement light Lme2' enters the photodetector 9, the measurement light Lme1' may be inhibited from entering the photodetector 9. In this case, it is possible to detect the first interference fringe and the second interference fringe separately. A specific method for inhibiting will be described later.

By analyzing the first interference fringe and the second interference fringe, it is possible to acquire a scattering potential. A refractive index can be calculated from the scattering potential.

In the data acquisition apparatus 1, a common optical path is positioned on the reflection side of the first beam splitter 3. The common optical path is positioned between the first beam splitter 3 and the predetermined beam splitter 14. In the common optical path, the first measurement optical path OP1 and the second measurement optical path OP2 overlap.

Whereas, only the reference optical path OPr is positioned on the transmission side of the first beam splitter 3. In the reference optical path OP1, an optical path overlapping the first measurement optical path OP1 and an optical path overlapping the second measurement optical path OP2 are not formed.

The reference optical path OPr may be positioned in the first direction, or in other words, on the reflection side of the first beam splitter 3. In this case, the first measurement optical path OP1 and the second measurement optical path OP2 are positioned in the second direction, or in other words, on the transmission side of the first beam splitter 3.

It is preferable that the data acquisition apparatus of the second embodiment have the abovementioned basic arrangement, the predetermined beam splitter be disposed in the reference optical path, the first light deflector have the predetermined beam splitter, the reference optical path be positioned on the transmission side of the predetermined beam splitter, and the first measurement optical path be positioned on the reflection side of the predetermined beam splitter.

In the data acquisition apparatus 1', the predetermined beam splitter 15 is disposed in the reference optical path OPr. The first measurement optical path OP1 is positioned on a reflection side of the predetermined beam splitter 15. The reference optical path OPr is positioned on a transmission side of the predetermined beam splitter 15.

The first light deflector 4 and the first measuring unit 6 are disposed in the first measurement optical path OP1. The first light deflector 4 has a predetermined beam splitter 15. The optical surface of the first light deflector 4 is an optical surface on which an optical film is formed.

The second light deflector 5 and the second measuring unit 7 are disposed in the second measurement optical path OP2. The optical surface of the second light deflector 5 is a mirror surface.

Illumination light is emitted from the light source 2. The illumination light enters the first beam splitter 3. At the first beam splitter 3, transmitted light and reflected light are generated from the illumination light. The transmitted light travels in the second direction. The reflected light travels in the first direction. The reflected light is the measurement light Lme2.

The reference optical path OPr is positioned in the second direction, or in other words, on the transmission side of the first beam splitter 3. The predetermined beam splitter 15 is disposed in the reference optical path OPr. The transmitted light enters the predetermined beam splitter 15. The predetermined beam splitter 15 has an optical surface on which an optical film is formed. Therefore, at the predetermined beam splitter 15, the reflected light and the transmitted light are generated. The reflected light is the measurement light Lme1. The transmitted light is the reference light Lref.

The reference optical path OPr is positioned on the transmission side of the predetermined beam splitter 15. The reference light Lref travels along the reference optical path OPr. The mirror 11 and the beam splitter 12 are disposed in the reference optical path OPr.

The first measurement optical path OP1 is positioned on the reflection side of the predetermined beam splitter 15. The measurement light Lme1 travels along the first measurement optical path OP1. The first measuring unit 6 and the mirror 13 are disposed in the first measurement optical path OP1.

The second measurement optical path OP2 is positioned in the first direction, or in other words, on the reflection side of the first beam splitter 3. The measurement light Lme2 travels along the second measurement optical path OP2. The second light deflector 5 and the second measuring unit 7 are disposed in the second measurement optical path OP2.

In the data acquisition apparatus 1', the measurement light Lme1', the measurement light Lme2', and the reference light Lref enter the photodetector 9. As a result, it is possible to detect a first interference fringe and a second interference fringe by the photodetector 9.

By analyzing the first interference fringe and the second interference fringe, it is possible to acquire a scattering potential. A refractive index can be calculated from the scattering potential.

In the data acquisition apparatus 1', a common optical path is positioned on the transmission side of the first beam splitter 3. The common optical path is positioned between the first beam splitter 3 and the predetermined beam splitter 15. In the common optical path, the first measurement optical path OP1 and the second measurement optical path OP2 overlap.

Whereas, only the second measurement optical path OP2 is positioned on the reflection side of the first beam splitter 3. In the second measurement optical path OP2, an optical path overlapping the first measurement optical path OP1 and an optical path overlapping the reference optical path OPr are not formed.

The second measurement optical path OP2 may be positioned in the first direction, or in other words, on the transmission side of the first beam splitter 3. In this case, the first measurement optical path OP1 and the reference optical path OPr are positioned in the first direction, or in other words, on the reflection side of the first beam splitter 3.

Acquisition of the scattering potential will be described below. A space in which a sample is disposed (hereinafter, referred to as a 'real space') is a space of which the unit is distance. The measurement light Lme1' and the measurement light Lme2' are physical amounts in the real space. The measurement light Lme1' and the measurement light Lme2' include the scattered light. The scattered light is also a physical amount in the real space.

The real space, by performing Fourier transformation, is transformed to a space of which the unit is frequency (hereinafter, referred to as a 'frequency space'). The interference fringe can be considered as indicative of information in the frequency space. The interference fringe includes information of a physical amount in the rear space, such as information of scattered light. The scattered light in the real space is indicated by the scattering potential intersecting the spherical shell of Ewald sphere in the frequency space.

Figure 3A:
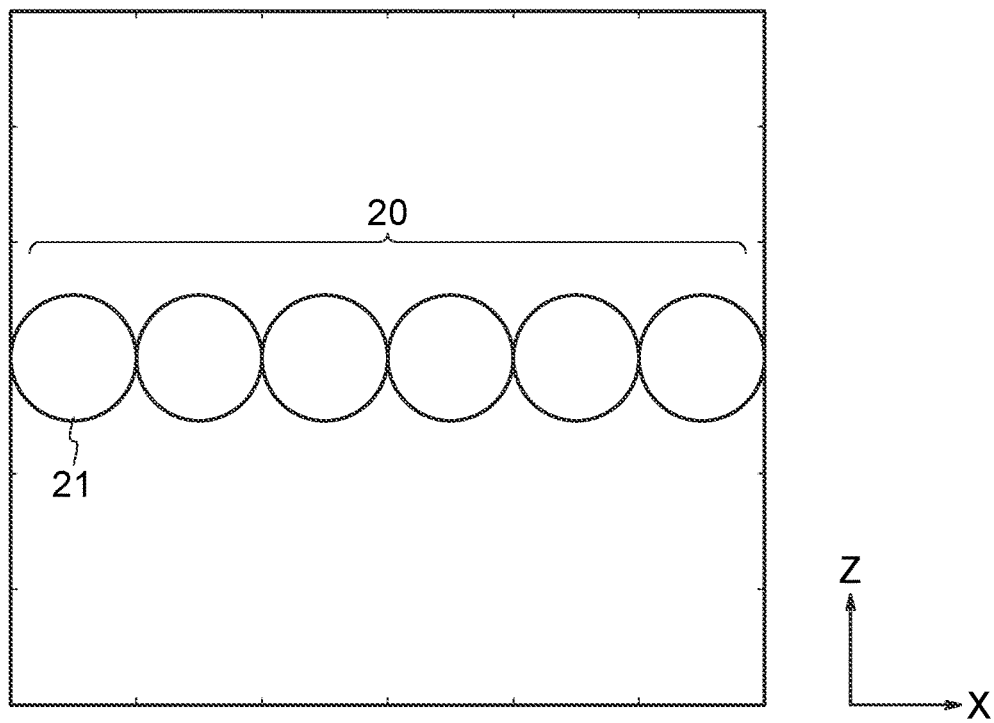
FIG. 3A and FIG. 3B are diagrams showing an example of a sample an example of a scattering potential.
Figure 3B:
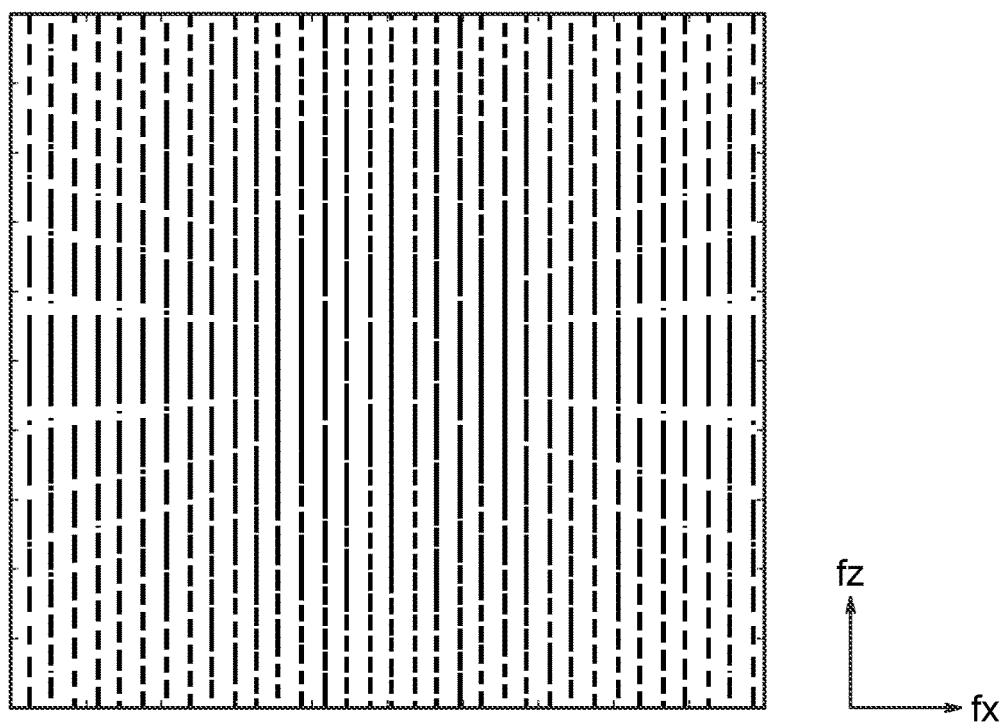

An example of a sample and an example of the scattering potential are shown in FIG. 3A and FIG. 3B. FIG. 3A shows a sample, and FIG. 3B shows the scattering potential.

A sample 20 has a sphere 21 which is colorless and transparent. A diameter of the sphere 21 is 10 μm and a refractive index of the sphere 21 is 1.364, for example. A periphery of the sphere 21 is filled with a colorless and transparent liquid. A refractive index of the liquid is 1.334, for example. Six spheres 21 are arranged side-by-side in line.

By using expression (30) as mentioned above, it is possible to acquire the scattering potential in the real space from a refractive-index distribution of the sample 20. By performing Fourier transformation for the scattering potential, it is possible to acquire the scattering potential in the frequency space. All physical information of the sample 20 such as a position, a size, and the refractive index can be expressed in numerical values. Accordingly, it is possible to acquire the scattering potential by simulation. The scattering potential shown in FIG. 3B indicates a result achieved by simulation.

An fx-direction in the frequency space corresponds to an x-direction in the real space. An fz-direction in the frequency space corresponds to a z-direction in the real space. As shown in FIG. 3B, the scattering potential in the frequency space is distributed in the fx-direction and the fz-direction.

As mentioned above, scattering of light occurs in the sample 20. A direction in which the scattering of light occurs and an amplitude thereof depend on an irradiation angle of measuring light with respect to the sample 20. Accordingly, as the irradiation angle of the measurement light is determined, only scattered light having a specific amplitude for each direction enters the photodetector 9. In other words, the scattered light which can be detected is restricted.

The scattering potential in the frequency space corresponds to the scattered light in the real space. In a case in which the scattered light that can be detected is restricted, the scattering potential that can be acquired is also restricted. In FIG. 3B, the scattering potential is distributed in the fx-direction and the fz-direction. However, the scattering potential that can be acquired is a part thereof.

The scattering potential that can be acquired depends on the irradiation angle of the measurement light. The irradiation angle of the measurement light, in the frequency space, can be indicated in a direction connecting a center of the spherical shell of Ewald sphere and a point of origin.

Figure 4A:
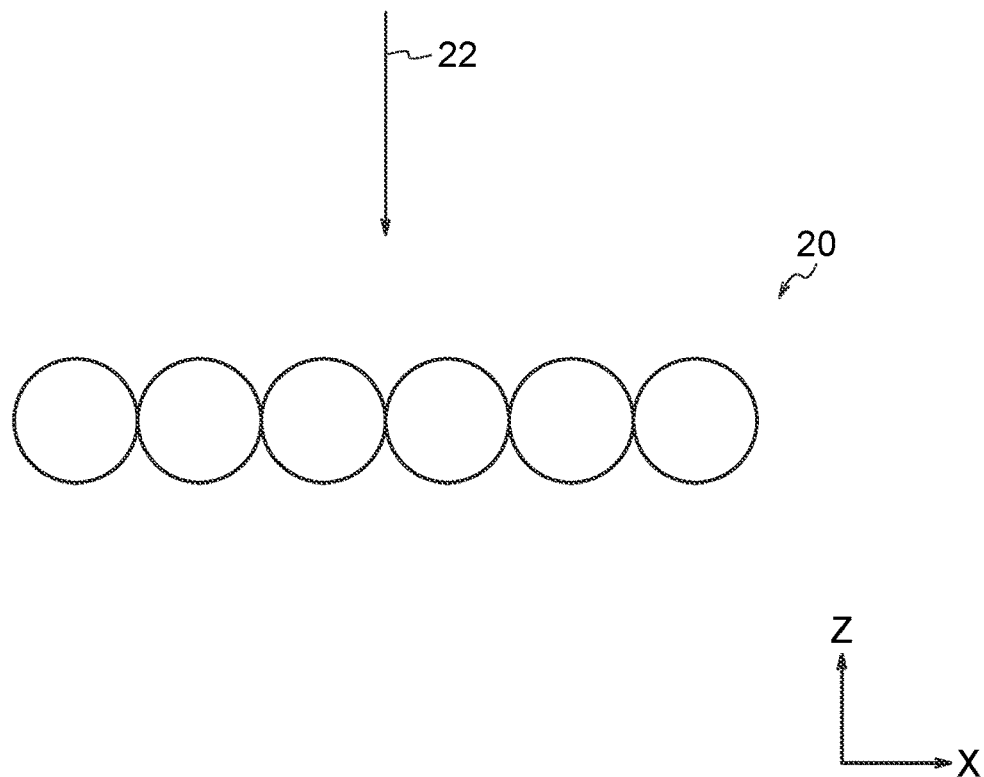
FIG. 4A and FIG. 4B are diagrams showing a relationship of a direction of measurement light and a position of a spherical shell of Ewald sphere.
Figure 4B:
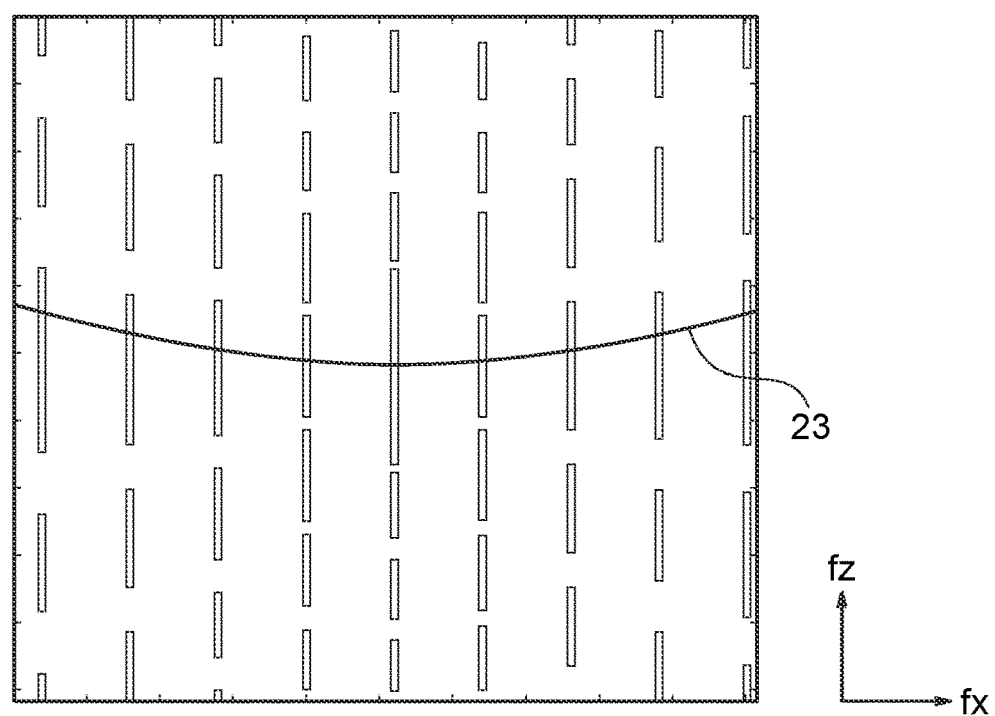

A relationship of a direction of the measurement light and a position of the spherical shell of the Ewald sphere is shown in FIG. 4A and FIG. 4B. FIG. 4A is a diagram showing the direction of the measurement light and FIG. 4B is a diagram showing the position of the spherical shell of Ewald sphere. FIG. 4B is a diagram in which a central portion of FIG. 3B is enlarged.

In FIG. 4A, measurement light 22 is irradiated perpendicularly with respect to the sample 20. In this case, a position of the spherical shell of Ewald sphere becomes as a curve 23 as shown in FIG. 4B.

In FIG. 4B, the curve 23 corresponds to the irradiation angle of the measurement light 22. Accordingly, only the scattering potential of a portion intersecting the curve 23 becomes the scattering potential that can be acquired practically.

As shown in FIG. 3B, the scattering potential is distributed in the fx-direction and the fz-direction. However, as shown in FIG. 4B, the scattering potential that can be acquired practically is restricted to the scattering potential of the portion intersecting the curve 23. When the number of scattering potentials that can be acquired is small, it becomes difficult to calculate the refractive index with a high degree of accuracy.

For making large the number of scattering potentials that can be calculated, the curve 23 is to be moved. By moving the curve 23, it is possible to acquire the scattering potential after the curve 23 has been moved, in addition to the scattering potential before moving the curve 23. Accordingly, it is possible to increase the number of scattering potentials that can be acquired.

A position of the curve 23 changes according to the irradiation angle of the measurement light. Accordingly, by changing the irradiation angle of the measurement light, it is possible to move the curve 23.

Figure 5A:
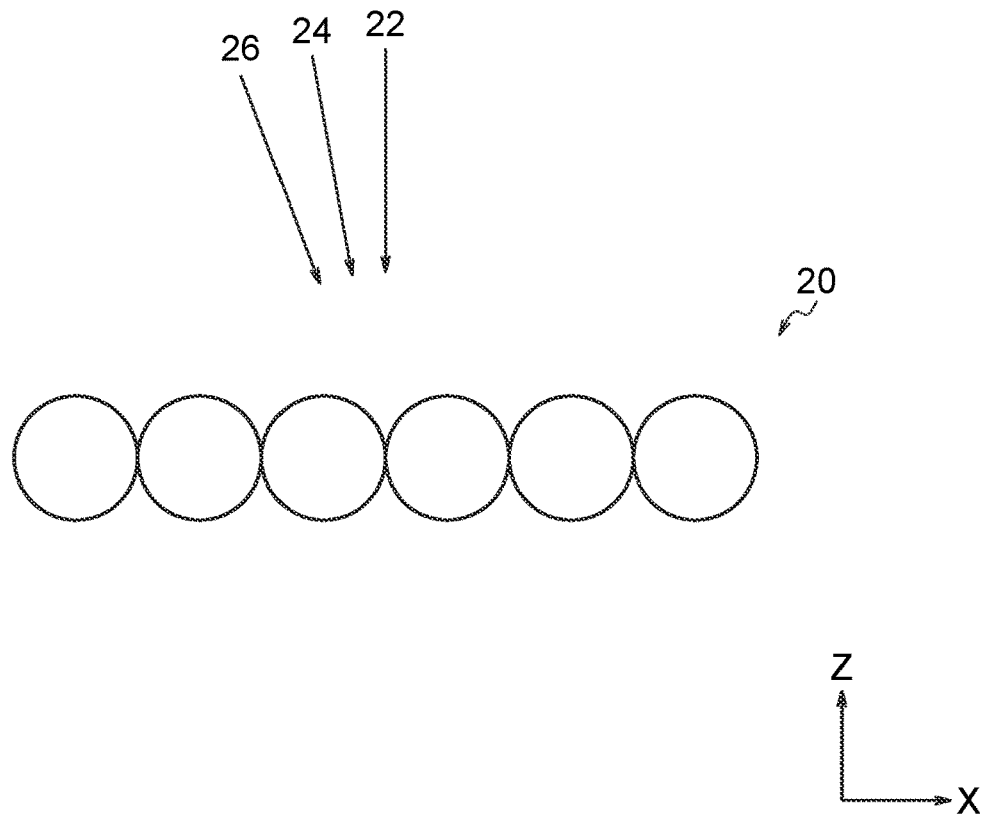
FIG. 5A and FIG. 5B are diagrams showing a relationship of a direction of measurement light and a position of a spherical shell of Ewald sphere.
Figure 5B:
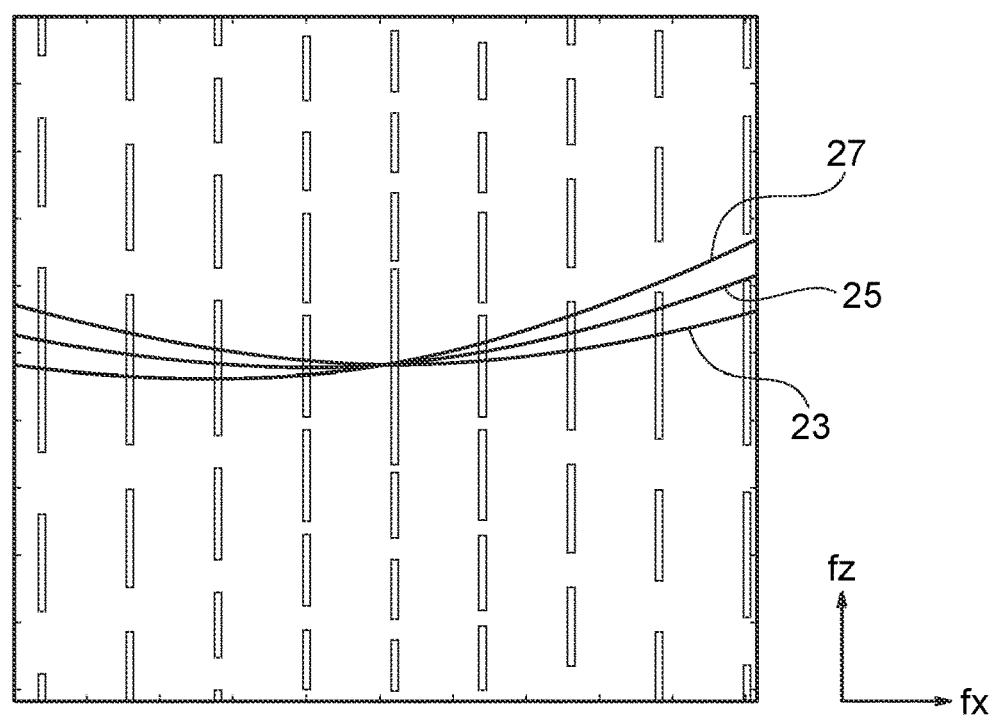

A relationship of a direction of the measurement light and a position of the spherical shell of the Ewald sphere is shown in FIG. 5A and FIG. 5B. FIG. 5A is a diagram showing the direction of the measurement light and FIG. 5B is a diagram showing the position of the spherical shell of Ewald sphere. The curve 23, a curve 25, and a curve 27 are curves indicating the spherical shell of Ewald sphere.

FIG. 5A shows an appearance in which the measurement light is irradiated from three directions with respect to the sample 20. The irradiation light 22 indicates measurement light which is irradiated perpendicularly with respect to the sample 20. In this case, the curve 23 intersects the scattering potential.

Measurement light 24 indicates light irradiated obliquely with respect to the sample 20. In this case, the curve 25 intersects the scattering potential. Measurement light 26 indicates light irradiated obliquely with respect to the sample 20. The measurement light 26 is irradiated at an angle larger than that of the irradiation light 24. In this case, the curve 27 intersects the scattering potential.

When the irradiation angle of the measurement light is changed from an angle of the measurement light 22 up to an angle of the measurement light 26, the spherical shell of Ewald sphere changes from a position of the curve 23 up to a position of the curve 27. The scattering potential acquired differs at each position. Accordingly, by widening a range of variation of the irradiation angle of the measurement light, an acquisition range of the scattering potential is widened.

Figure 6A:
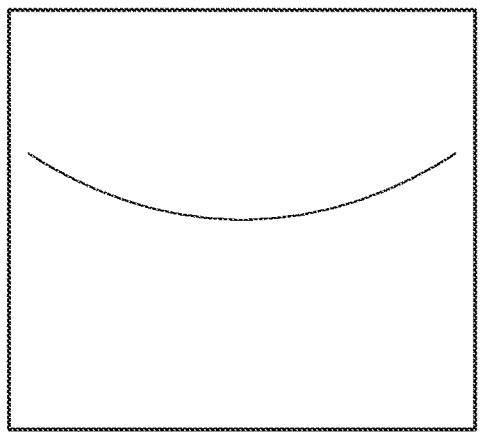
FIG. 6A, FIG. 6B, FIG. 6C, and FIG. 6D are diagrams showing a relationship of an acquisition range of a scattering potential and a shape of a sample.
Figure 6B:
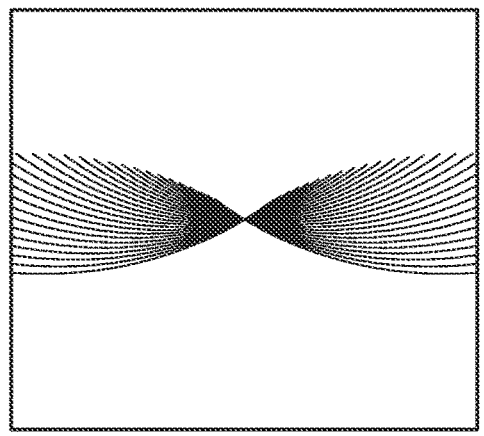
Figure 6B:
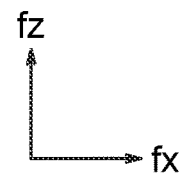
Figure 6C:
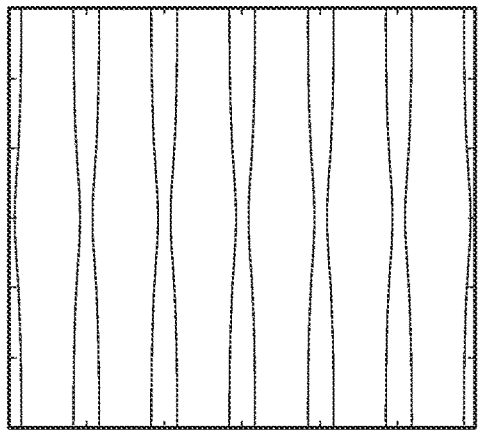
Figure 6D:
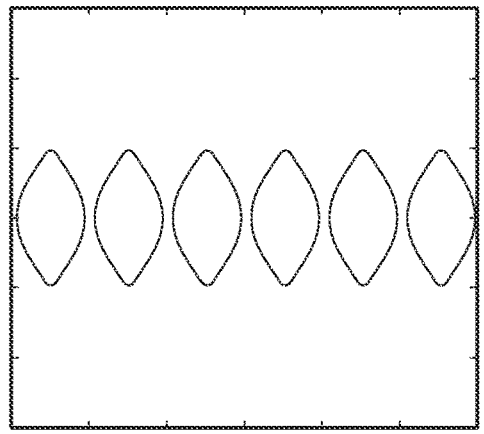
Figure 6D:
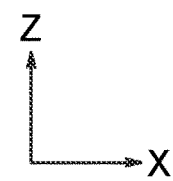

A relationship of an acquisition range of the scattering potential and a sample are shown in FIG. 6A, FIG. 6B, FIG. 6C, and FIG. 6D. FIG. 6A is a diagram showing a case in which the acquisition range of the scattering potential is narrow, FIG. 6B is a diagram showing a case in which the acquisition range of the scattering potential is wide, FIG. 6C is a diagram showing the shape of the sample when the acquisition range is narrow, and FIG. 6D is a diagram showing the shape of the sample when the acquisition range is wide.

Both the shape of the sample shown in FIG. 6C and the shape of the sample shown in FIG. 6D are shapes obtained by calculation. The scattering potential is used for the calculation.

FIG. 6A shows a case in which the irradiation direction of the measurement light is only one direction. In this case, there is only one curve indicating the spherical shell of Ewald sphere. FIG. 6B shows a case in which the irradiation directions of the measurement are in plurality. In this case, there is a plurality of curves indicating the spherical shell of Ewald sphere. Accordingly, when there is a plurality of curves, it is possible to acquire even larger number of scattering potentials as compared to the number of scattering potentials a case in which there is only one curve.

As mentioned above, the sample and also the liquid are colorless and transparent. However, a refractive index of the sample and a refractive index of the liquid differ. Accordingly, the clearer a difference in the refractive index, clearer is a boundary of the sample and the liquid, or in other words, clearer is an outline of the sample.

From a comparison of FIG. 6C and FIG. 6D, it is evident that the wider the range in which the scattering potential can be acquired, the clearer is the shape of the sample. In other words, it is evident that the larger the number of scattering potentials that can be acquired, it is possible to calculate the refractive index more accurately.

The outline of the sample in the x-direction is clear to the same degree in FIG. 6C and FIG. 6D. However, regarding the outline of the sample in the z-direction, the outline is clearer in FIG. 6D in which the number of scattering potentials that can be acquired is large, as compared to the outline in FIG. 6C.

However, even in FIG. 6D in which the outline of the sample is clear, the outline of the sample in the z-direction is not as clear as the outline of the sample in the x-direction.

Figure 7A:
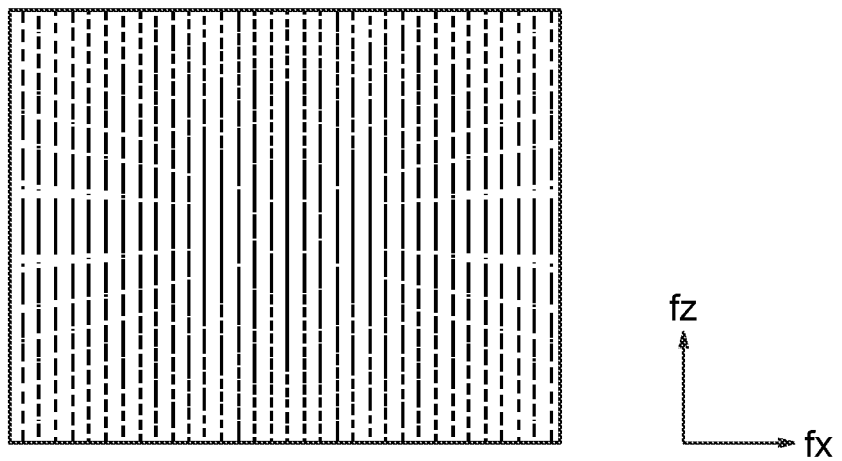
FIG. 7A, FIG. 7B, and FIG. 7C are diagrams showing a relationship of a scattering potential and the acquisition range of the scattering potential.
Figure 7B:
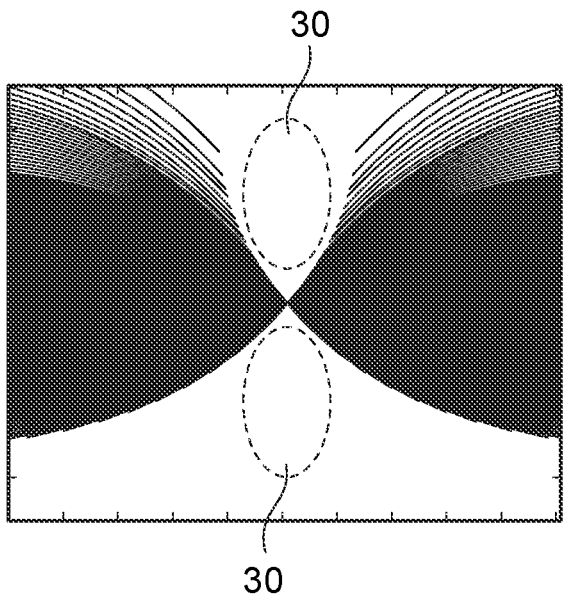
Figure 7C:
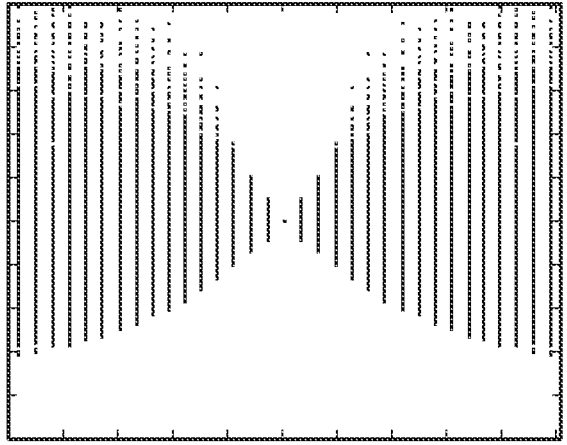

A relationship of the scattering potential and the acquisition range of the scattering potential is shown in FIG. 7A, FIG. 7B, and FIG. 7C. FIG. 7A is a diagram showing the scattering potential, FIG. 7B is a diagram showing the acquisition range of the scattering potential, and FIG. 7C is a diagram showing the scattering potential acquired.

As shown in FIG. 7A, the scattering potential is distributed in the fx-direction and the fz-direction. On the other hand, as shown in FIG. 7B, the acquisition range of the scattering potential is also spread in the fx-direction and the fz-direction.

However, in the fz-direction, there is an area 30 on the fz-axis and in the vicinity thereof (hereinafter, referred to as a 'vicinity of the fz-axis'). There is no spherical shell of Ewald sphere in the area 30. Therefore, it is not possible to acquire the scattering potential in the area 30. The area 30 indicates a range in which it is not possible to acquire the scattering potential.

As just described, for the fz-direction, there is an area in which it is not possible to acquire the scattering potential near the fz-axis. Consequently, as shown in FIG. 7C, it is not possible to acquire the scattering potential near the fz-axis.

The data acquisition apparatus of the first embodiment and the data acquisition apparatus of the second embodiment (hereinafter, referred to as a 'data acquisition apparatus of the present embodiment') are provided with the first measurement optical path and the second measurement optical path. Even in a case in which the measurement light is irradiated to a sample by the first measurement optical path, and in a case in which the measurement light is irradiated to the sample by the second measurement optical path, the area 30 is generated.

Figure 8A:
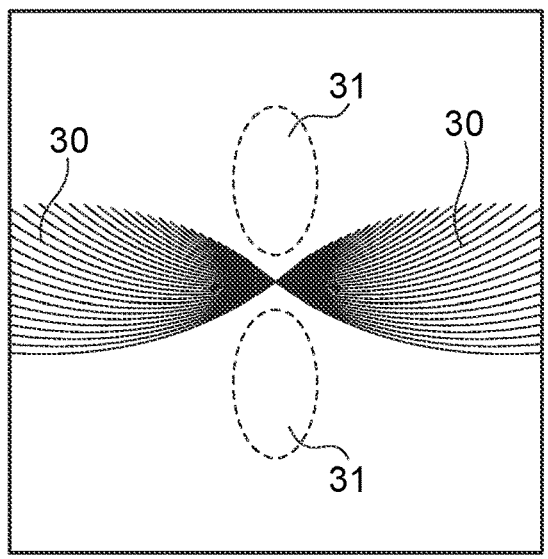
FIG. 8A, FIG. 8B, and FIG. 8C are diagrams showing an acquisition range of the scattering potential in the data acquisition apparatus of the present embodiment.
Figure 8B:
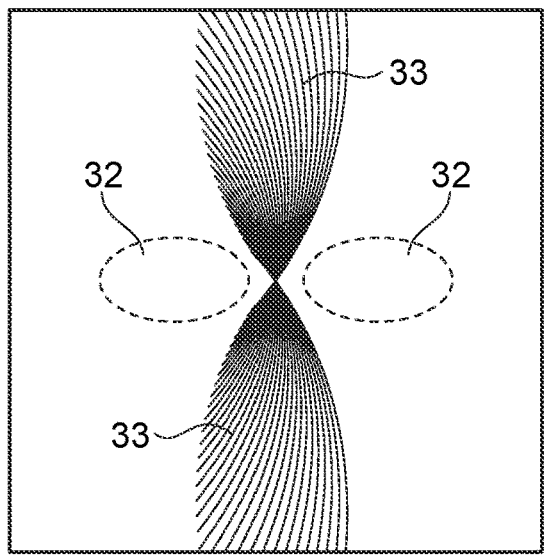
Figure 8C:
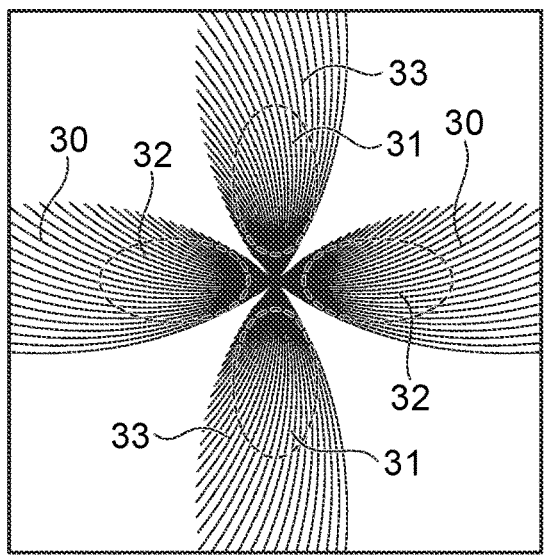

The acquisition range of the scattering potential in the data acquisition apparatus of the present embodiment is shown in FIG. 8A, FIG. 8B, and FIG. 8C. FIG. 8A is a diagram showing an acquisition range of the scattering potential in the first measurement optical path, FIG. 8B shows an acquisition range of the scattering potential in the second measurement optical path, and FIG. 8C shows an acquisition range of the scattering potential that can be acquired in the two optical paths.

Description will be made by using the data acquisition apparatus 1. In the first measurement optical path OP1, the measurement light is irradiated to a sample from the z-direction. Consequently, as shown in FIG. 8A, the areas 30 are positioned in the fx-direction and areas 31 are positioned in the z-direction. The areas 30 are a range in which the scattering potential can be acquired. The areas 31 are a range in which the scattering potential cannot be acquired.

The second measurement optical path OP2 intersects the first measurement optical path OP1. In a case in which the first measurement optical path OP1 and the second measurement optical path OP2 are orthogonal, in the second measurement optical path OP2, the measurement light is irradiated to the sample from the x-direction. Consequently, as shown in FIG. 8B, areas 32 are positioned in the fx-direction and areas 33 are positioned in the fz-direction. The areas 32 are a range in which the scattering potential cannot be acquired. The areas 33 are a range in which the scattering potential can be acquired.

FIG. 8C is a diagram showing the acquisition range of the scattering potential that can be acquired in the first measurement optical path OP1 and the second measurement optical path OP2. FIG. 8C is a diagram in which FIG. 8A and FIG. 8B are superposed.

The area 31, in the first measurement optical path OP1, is a range in which the scattering potential cannot be acquired. However, as shown in FIG. 8C, in the area 31 in the first measurement optical path OP1, the area 33 in the second measurement optical path OP2 is positioned. Accordingly, the scattering potential which could not be acquired in the first measurement optical path OP1 can be acquired in the second measurement optical path OP2.

Figure 9A:
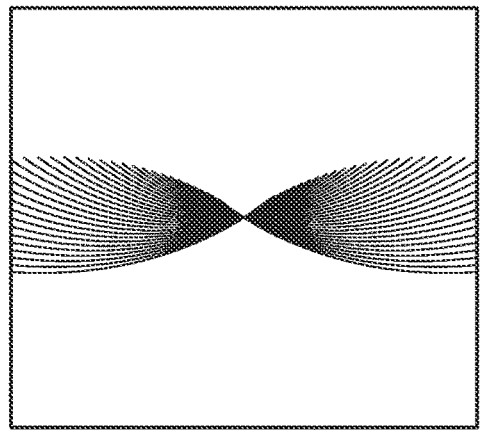
FIG. 9A and FIG. 9B, FIG. 9C and FIG. 9D are diagrams showing a relationship of an acquisition range of the scattering potential and a shape of a sample.
Figure 9B:
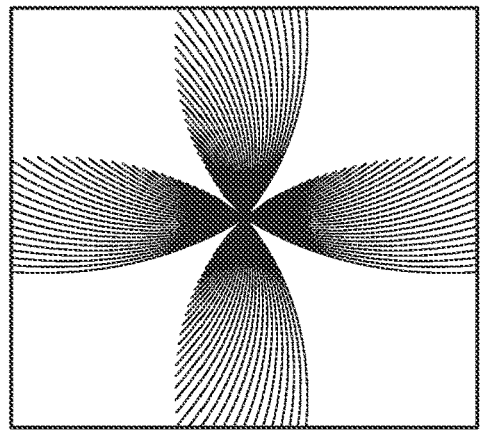
Figure 9B:
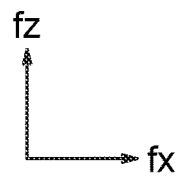
Figure 9C:
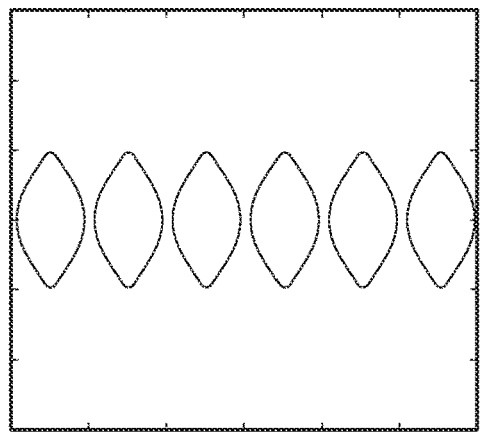
Figure 9D:
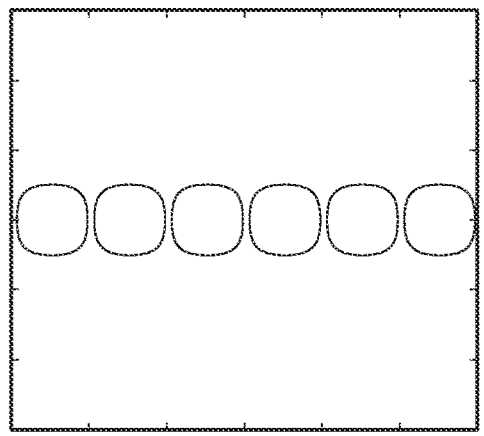
Figure 9D:
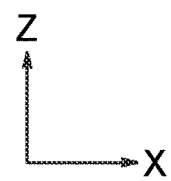

A relationship of an acquisition range of the scattering potential and a shape of a sample are shown in FIG. 9A, FIG. 9B, FIG. 9C and FIG. 9D. FIG. 9A is a diagram showing an acquisition range of the scattering potential in one measurement optical path, FIG. 9B is a diagram showing an acquisition range of the scattering potential in two measurement optical paths, FIG. 9C is a diagram showing a shape of a sample in one measurement optical path, and FIG. 9D is a diagram showing a shape of the sample in the two measurement optical paths.

Both the shape of the sample shown in FIG. 9C and the shape of the sample shown in FIG. 9D are shapes obtained by calculation. The scattering potential is used for the calculation.

FIG. 9A shows the acquisition range of the scattering potential when only the first measurement optical path OP1 is used. In this case, the acquisition range of the scattering potential is spread mainly in the fx-direction.

FIG. 9B shows the acquisition range of the scattering potential when the first measurement optical path OP1 and the second measurement optical path OP2 are used. In this case, the acquisition range of the scattering potential is spread in the vicinity of the fz-axis, in addition to the fx-direction. Accordingly, in the case in which the two measurement optical paths are used, it is possible to reduce the range in which the scattering potential cannot be acquired as compared to the case in which only one measurement optical path is used.

From the comparison of FIG. 9C and FIG. 9D, it is evident that, the smaller the range in which the scattering potential cannot be acquired, the clearer is the shape of the sample. Particularly, regarding an outline of the sample in the z-direction, it is clearer in FIG. 9D as compared to that in FIG. 9C. As just described, it is evident that the smaller the range in which the scattering potential cannot be acquired, it is possible to calculate the refractive index more accurately.

In the data acquisition apparatus of the present embodiment, the range in which the scattering potential cannot be acquired is small. Therefore, according to the data acquisition apparatus of the present embodiment, it is possible to calculate the refractive index accurately. Consequently, even for a colorless and transparent sample for instance, it is possible to make an outline of the sample clear. As a result, it is possible to know the shape of the sample accurately.

Detection of an interference fringe will be described below. For detecting the first interference fringe and the second interference fringe separately, the measurement light Lme1' and the measurement light Lme2' are to be inhibited from entering simultaneously the photodetector 9. An arrangement for inhibiting the two measurement lights from entering simultaneously will be described below.

Figure 10A:
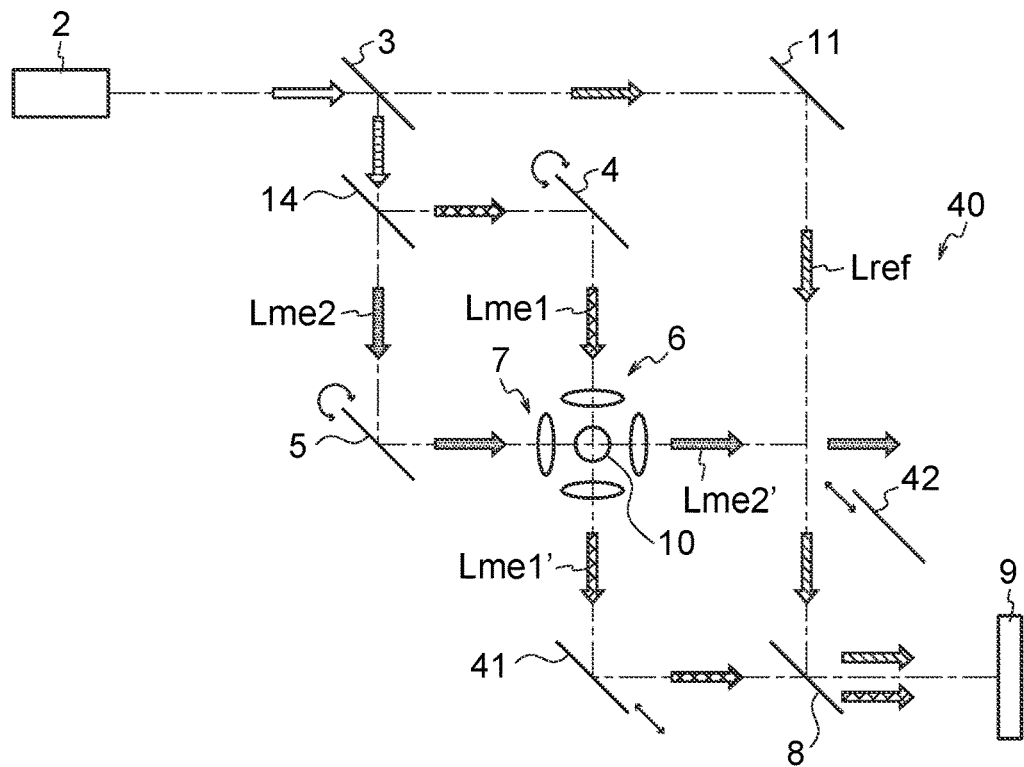
FIG. 10A and FIG. 10B are diagrams showing an example 1 of the data acquisition apparatus of the present embodiment.
Figure 10B:
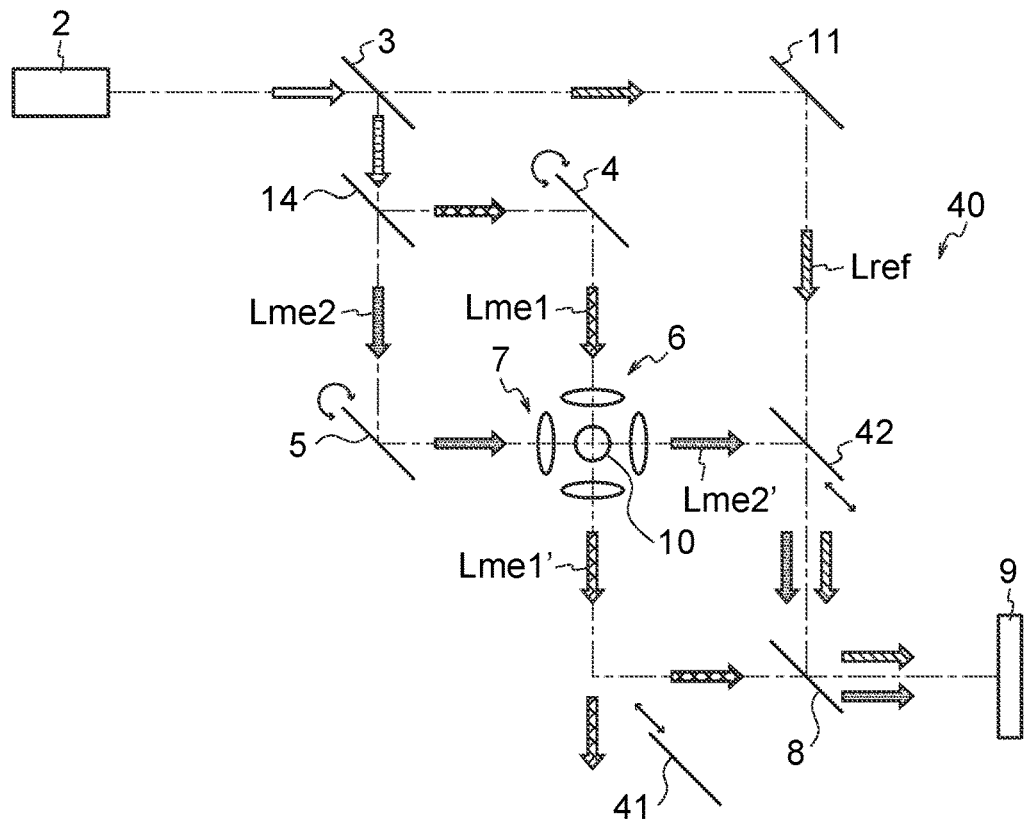

An example 1 of the data acquisition apparatus of the present embodiment is shown in FIG. 10A and FIG. 10B. Same reference numerals are assigned to components that are same as in the data acquisition apparatus 1, and description thereof is omitted.

FIG. 10A is a diagram showing a state in which one measurement light is inhibited from entering a photodetector. FIG. 10B is a diagram showing a state in which the other measurement light is inhibited from entering the photodetector. Same reference numerals are assigned to components that are same as in the data acquisition apparatus 1, and description thereof is omitted. Moreover, the components are depicted in a simplified form.

A data acquisition apparatus 40 includes a mirror 41 and a beam splitter 42. The mirror 41 is disposed near the first measurement optical path OP1. The beam splitter 42 is disposed near a point of intersection of the second measurement optical path OP2 and the reference optical path OPr.

Both the mirror 41 and the beam splitter 42 move. By moving the mirror 41, the mirror 41 is either positioned in the first measurement optical path OP1 or positioned outside the first measurement optical path OP1. By moving the beam splitter 42, the beam splitter 42 is either positioned in the second measurement optical path OP2 or positioned outside the second measurement optical path OP2.

In FIG. 10A, the mirror 41 is positioned in the first measurement optical path OP1 and the beam splitter 42 is positioned outside the second measurement optical path OP2. In this case, the measurement light Lme1' is reflected at the mirror 41. Accordingly, the measurement light Lme1' enters the photodetector 9.

On the other hand, the measurement light Lme2' is not reflected toward the second beam splitter 8. Accordingly, the measurement light Lme2' does not enter the photodetector 9. As a result, it is possible to detect only the first interference fringe.

In FIG. 10B, the mirror 41 is positioned outside the first measurement optical path OP1 and the beam splitter 42 is positioned in the second measurement optical path OP2. In this case, the measurement light Lme1' is not reflected toward the second beam splitter 8. Accordingly, the measurement light Lme1' does not enter the photodetector 9.

On the other hand, the measurement light Lme2' enters the beam splitter 42. The beam splitter 42 has an optical surface on which an optical film is formed. From an incident light, light travelling toward the transmission side and light travelling toward the reflection side are generated by the optical film.

At the beam splitter 42, a part of the measurement light Lme2' is reflected by the optical film and the remaining light passes through the optical film. Accordingly, the measurement light Lme2' enters the photodetector 9.

Figure 11A:
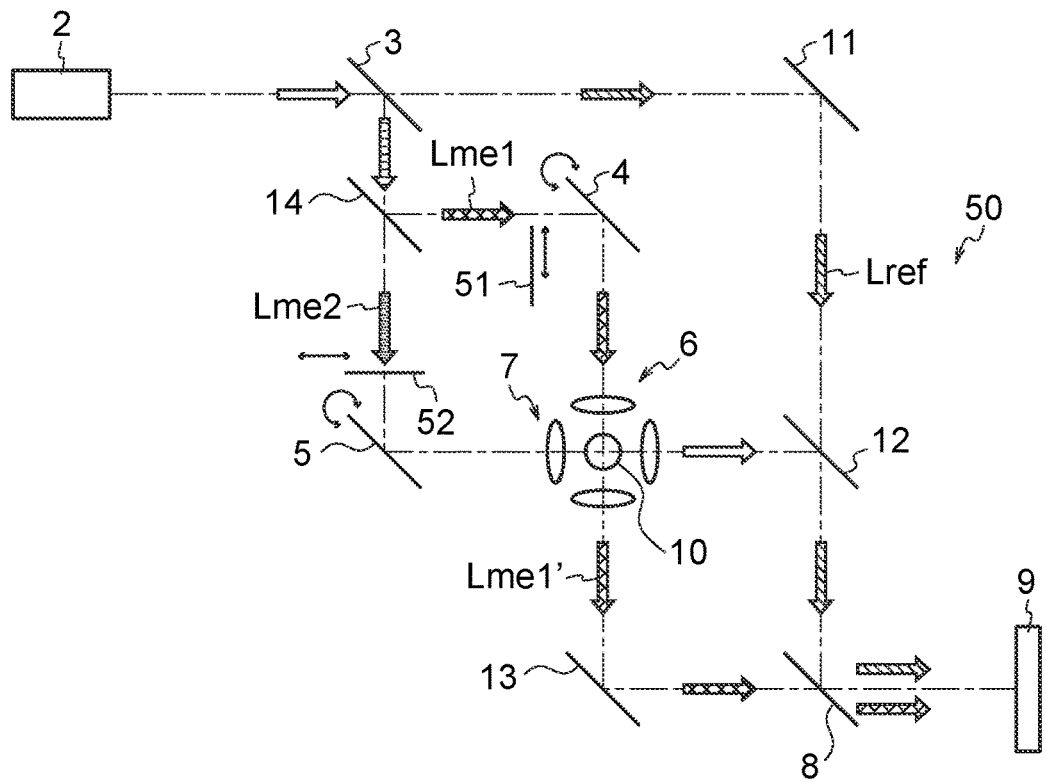
FIG. 11A and FIG. 11B are diagrams showing an example 2 of the data acquisition apparatus of the present embodiment.
Figure 11B:
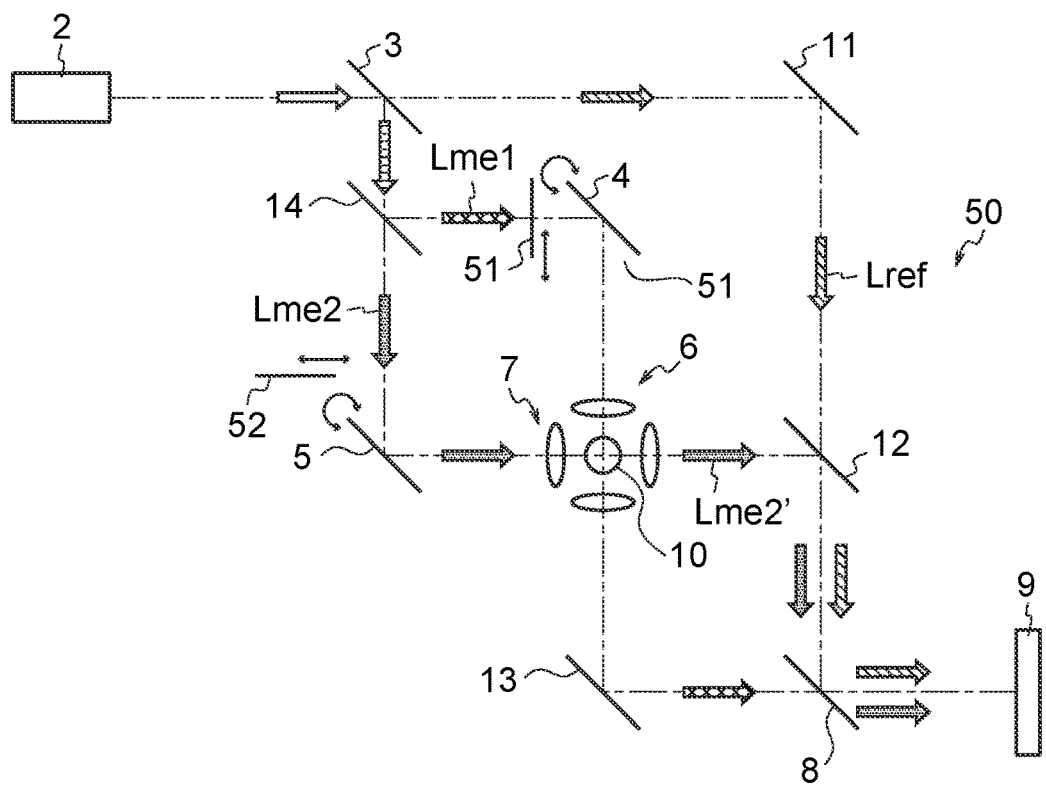

An example 2 of the data acquisition apparatus of the present embodiment is shown in FIG. 11A and FIG. 11B. Same reference numerals are assigned to components that are same as in the data acquisition apparatus 1, and description thereof is omitted.

FIG. 11A is a diagram showing a state in which one measurement light is inhibited from entering the photodetector. FIG. 11B is a diagram showing a state in which the other measurement light is inhibited from entering the photodetector. Same reference numerals are assigned to components that are same as in the data acquisition apparatus 1', and description thereof is omitted.

A data acquisition apparatus 50 includes a light shielding member 51 and a light shielding member 52. The light shielding member 51 is disposed near the first measurement optical path OP1. The light shielding member 52 is disposed near the second measurement optical path OP2.

Both the light shielding member 51 and the light shielding member 52 move. By moving the light shielding member 51, the light shielding member 51 is either positioned in the first measurement optical path OP1 or positioned outside the first measurement optical path OP1. By moving the light shielding member 52, the light shielding member 52 is either positioned in the second measurement optical path OP2 or positioned outside the second measurement optical path OP2.

In FIG. 11A, the light shielding member 51 is positioned outside the first measurement optical path OP1 and the second light shielding member 52 is positioned in the second measurement optical path OP2. In this case, the measurement light Lme1 not being shielded by the light shielding member 51, the measurement light Lme1' enters the photodetector 9. On the other hand, the measurement light Lme2 being shielded by the light shielding member 52, the measurement light Lme2' does not enter the photodetector 9. Consequently, it is possible to detect only the first interference fringe.

In FIG. 11B, the light shielding member 51 is positioned in the first measurement optical path OP1 and the light shielding member 52 is positioned outside the second measurement optical path OP2. In this case, the measurement light Lme1 being shielded by the light shielding member 51, the measurement light Lme1' does not enter the photodetector 9. On the other hand, the measurement light Lme2 not being shielded by the light shielding member 52, the measurement light Lme2' enters the photodetector 9. Consequently, it is possible detect only the second interference fringe.

Figure 12:
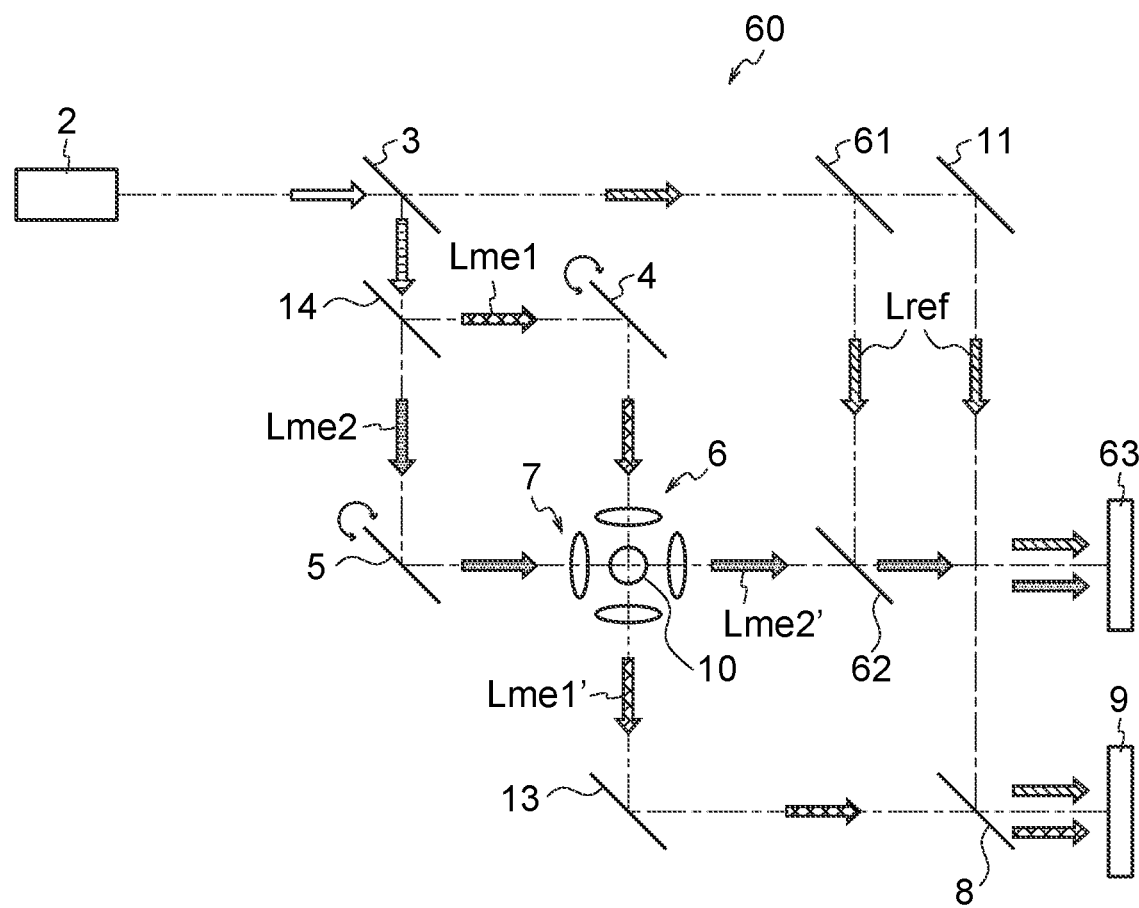
FIG. 12 is a diagram showing an example 3 of the data acquisition apparatus of the present embodiment.

An example 3 of the data acquisition apparatus of the present embodiment is shown in FIG. 12. Same reference numerals are assigned to components that are same as in the data acquisition apparatus 1, and description thereof is omitted.

A data acquisition apparatus 60 includes a beam splitter 61, a beam splitter 62, and a photodetector 63. The beam splitter 61 is disposed between the first beam splitter 3 and the mirror 11. The beam splitter 62 and the photodetector 63 are disposed in the second measurement optical path OP2.

The beam splitter 61 has an optical surface on which an optical film is formed. From an incident light, light travelling toward the transmission side and light travelling toward the reflection side are generated by the optical film. In the data acquisition apparatus 60, the reference optical path OPr is positioned at each of a reflection side of the beam splitter 61 and a transmission side of the beam splitter 61.

The reference light Lref reflected at the beam splitter 61 enters the beam splitter 62. The beam splitter 62 has an optical surface on which an optical film is formed. From an incident light, light travelling toward the transmission side and light travelling toward the reflection side are generated by the optical film.

At the beam splitter 62, a part of the reference light Lref is reflected by the optical film and the remaining light passes through the optical film. The reference light Lref reflected at the beam splitter 62 enters the photodetector 63.

The measurement light Lme2' enters the beam splitter 62. At the beam splitter 62, a part of the measurement light Lme2' is reflected by the optical film and the remaining light passes through the optical film. The measurement light Lme2' passed through the beam splitter 62 enters on the photodetector 63.

The measurement light Lme1' and the reference light Lref enter the photodetector 9. Accordingly, in the photodetector 9, the first interference fringe is generated. The measurement light Lme2' and the reference light Lref enter the photodetector 63. Accordingly, in the photodetector 62, the second interference fringe is generated.

In the data acquisition apparatus 60, similarly as in the data acquisition apparatus 40 and the data acquisition apparatus 50, it is possible to detect the first interference fringe and the second interference fringe separately. However, in the data acquisition apparatus 40 and the data acquisition apparatus 50, there is a time difference in the detection of the first interference fringe and the second interference fringe. Whereas, in the data acquisition apparatus 60, it is possible to detect the first interference fringe and the second interference fringe simultaneously.

The light deflector will be described below. In the data acquisition apparatus of the present embodiment, for the first light deflector 4 and the second light deflector 5, for instance, a galvanometer scanner, a polygon scanner, or an acousto-optic deflector (AOD) can be used.

A size of the galvanometer scanner or a size of the acousto-optic deflector is smaller as compared a size of the polygon scanner. Therefore, when the galvanometer scanner or the acousto-optic deflector is used, it is possible to reduce a size of the data acquisition apparatus.

In the galvanometer scanner, it is possible to achieve a large angle of deflection. However, it is difficult to deflect light at a high speed. Moreover, light can be deflected not only by a mirror but also by a half mirror. Therefore, it is possible to use the galvanometer scanner in any of the data acquisition apparatus 1 and the data acquisition apparatus 1'.

In the polygon scanner, it is possible to achieve a large angle of deflection, and to deflect light at a high speed. Deflection of light is carried out by a mirror. Accordingly, in the data acquisition apparatus 1', it is not possible to use the polygon mirror for the first light deflector 15.

In the acousto-optic deflector (AOD), it is possible to deflect light at a high speed. However, the angle of deflection is small. In a case of using the acousto-optic deflector in the data acquisition apparatus 1, a fixed mirror is disposed at each of a position of the first light deflector 4 and a position of the second light deflector 5. Moreover, the acousto-optic deflector is disposed between the fixed mirror and the first measuring unit 6, and between the fixed mirror and the second measuring unit 7. A similar arrangement is made for the data acquisition apparatus 1'.

In the data acquisition apparatus of the present embodiment, it is preferable that each of an optical surface of the first light deflector and an optical surface of the second light deflector be conjugate with a point of intersection of the first measurement optical path and the second measurement optical path, and each of the first light deflector and the second light deflector be a galvanometer scanner.

The optical surface of the first light deflector 4 is conjugate with the point of intersection P. In the first light deflector 4, the measurement light Lme1 is deflected at the optical surface. In a case in which the optical surface is conjugate with the point of intersection P, even when an angle of the measurement light Lme1 irradiated to the sample 10 changes, a central light ray of the measurement light Lme1 passes through the point of intersection P all the time. As a result, it is possible to change a direction of the spherical shell of Ewald sphere with a point of intersection of the fx-axis and the fz-axis as a center as shown in FIG. 5B.

The optical surface of the second light deflector 5 is also conjugate with the point of intersection P. In the second light deflector 5, the measurement light Lme2 is deflected at the optical surface. In a case in which the optical surface is conjugate with the point of intersection P, even when an angle of the measurement light Lme2 irradiated to the sample 10 changes, a central light ray of the measurement light Lme2 passes through the point of intersection P all the time.

The acquisition range of the scattering potential in this case is symmetrical about the fz-axis. Accordingly, when the refractive index is calculated, it is possible to make small a bias of the refractive index distribution in the x-axis direction.

It is preferable to use a galvanometer scanner for each of the first light deflector 4 and the second light deflector 5. By doing so, it is possible to reduce the size of the data acquisition apparatus. Moreover, it is possible to use the galvanometer scanner for both the data acquisition apparatus 1 and the data acquisition apparatus 1'. Accordingly, it is possible to improve a degree of freedom at the time of making a layout of the first measurement optical path OP1, the second measurement optical path OP2, and the reference optical path OPr.

It is preferable that the data acquisition apparatus of the present embodiment include a third light deflector and a fourth light deflector, the third light deflector be disposed between the first measuring unit and the photodetector, the fourth light deflector be disposed between the second measuring unit and the photodetector, each of an optical surface of the third light deflector and an optical surface of the fourth light deflector be conjugate with a point of intersection of the first measurement optical path and the second measurement optical path, and each of the third light deflector and the fourth light deflector be a galvanometer scanner.

Figure 13:
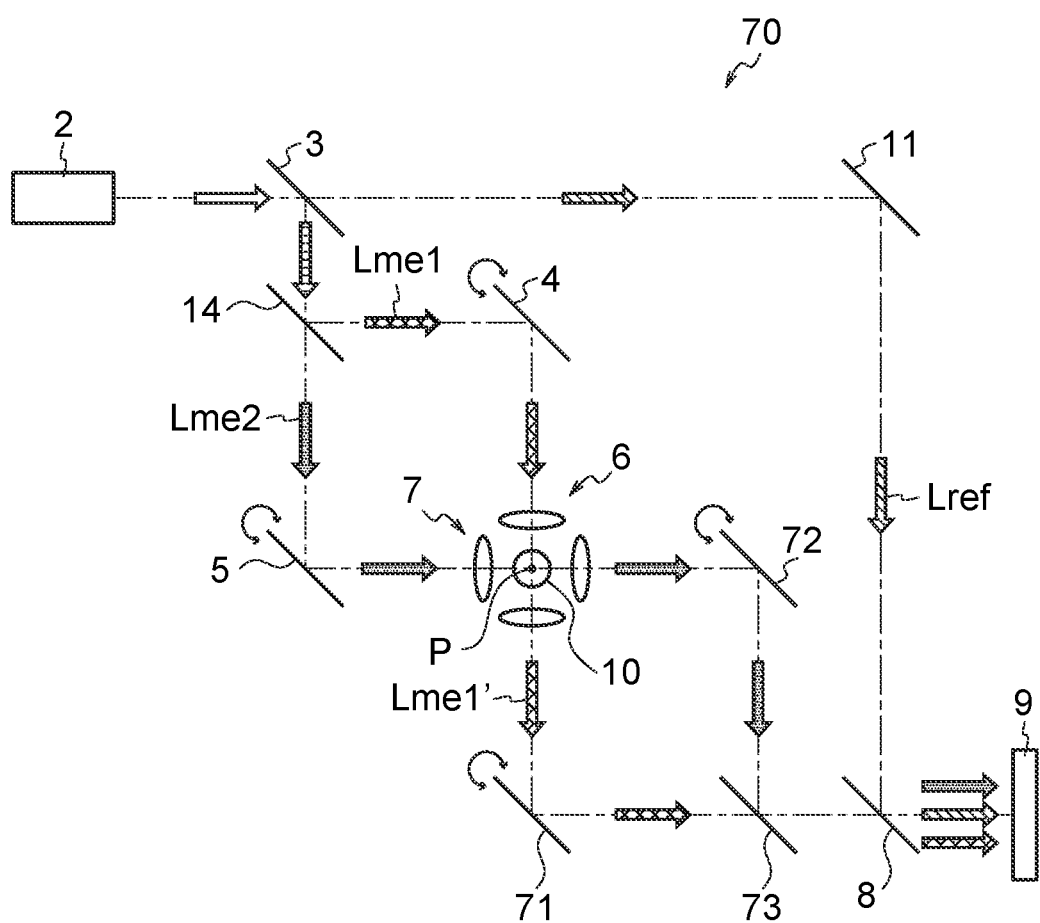
FIG. 13 is a diagram showing an example 4 of the data acquisition apparatus of the present embodiment.

An example 4 of the data acquisition apparatus of the present embodiment is shown in FIG. 13. Same reference numerals are assigned to components that are same as in the data acquisition apparatus 1', and description thereof is omitted.

A data acquisition apparatus 70 includes a third light deflector 71 and a fourth light deflector 72. The third light deflector 71 is disposed between the first measuring unit 6 and the photodetector 9. The fourth light detecting element 72 is disposed between the second measuring unit 7 and the photodetector 9.

Although it is omitted in the diagram, for instance, the abovementioned light shielding member 51 and the light shielding member 52 are disposed in the data acquisition apparatus 70. Accordingly, in the data acquisition apparatus 70, it is possible to detect the first interference fringe and the second interference fringe separately.

The measurement light Lme1' emerged from the first measuring unit 6 is reflected at the third light deflector 71, and enters a beam splitter 73. The light Lme2' emerged from the second measuring unit 7 is reflected at the fourth light deflector 72, and enters the beam splitter 73.

The beam splitter 73 has an optical surface on which an optical film is formed. From an incident light, light traveling toward the transmission side and light traveling toward the reflection side are generated by the optical film.

At the beam splitter 73, a part of the measurement light Lme1' and a part of the measurement light Lme2' are reflected by the optical film and the remaining light passes through the optical film. The measurement light Lme1' passed through the beam splitter 73 and the measurement light Lme2' reflected at the beam splitter 73 enter the photodetector 9.

An optical surface of the third light deflector 71 is conjugate with the point of intersection P. As mentioned above, the point of intersection P is conjugate with the optical surface of the first light deflector 4. Accordingly, the optical surface of the third light deflector 71 is conjugate with the optical surface of the first light deflector 4.

Light is assumed not to be deflected at the third light deflector 71. In this case, since the measurement light Lme1 is deflected at the first light deflector 4, an angle of emergence of the measurement light Lme1' emerging from the third light deflector 71 changes. Consequently, a position of the measurement light Lme1' on the photodetector 9 changes.

For detecting the first interference fringe even when the position of the measurement light Lme1' changes, it is necessary to make a beam diameter of the reference light Lref large. As the beam diameter of the reference light Lref becomes large, it is necessary to make a light receiving surface of the photodetector 9 large.

Whereas, when the light is deflected at the third light deflector 71, it is possible to cancel the deflection of light at the first light deflector 4 by the deflection of the third light deflector 71. In this case, the angle of emergence of the measurement light Lme1' emerged from the third light deflector 71 does not change. As a result, the position of the measurement light Lme1' on the photodetector 9 does not change.

Since the position of the measurement light Lme1' does not change, it is possible to detect the first interference fringe even without making the beam diameter of the reference light Lref large. Since the beam diameter of the reference light Lref does not become large, it is not necessary to make the light receiving surface of the photodetector 9 wide.

An optical surface of the fourth light deflector 72 is conjugate with the point of intersection P. As mentioned above, the point of intersection P is conjugate with the optical surface of the second light deflector 5. Accordingly, the optical surface of the fourth light deflector 72 is conjugate with the optical surface of the second light deflector 5.

Therefore, it is possible to cancel the deflection of light at the second light deflector 5 by the deflection of the fourth light deflector 72. In this case, an angle of emergence of the measurement light Lme2' emerged from the fourth light deflector 72 does not change. As a result, a position of the measurement light Lme2' on the photodetector 9 does not change.

Since the position of the measurement light Lme2' does not change, it is possible to detect the second interference fringe even without making the beam diameter of the reference light Lref large. Since the beam diameter of the reference light Lref does not become large, it is not necessary to make the light receiving surface of the photodetector 9 wide.

In the data acquisition apparatus 70, between the second beam splitter 8 and the photodetector 9, each of the first measurement optical path OP1 and the second measurement optical path OP2 is positioned parallel with respect to the reference optical path OPr. Moreover, between the second beam splitter 8 and the photodetector 9, the first measurement optical path OP1, the second measurement optical path OP2, and the reference optical path OPr overlap. Accordingly, it is possible to reduce a size of the photodetector 9.

Figure 14:
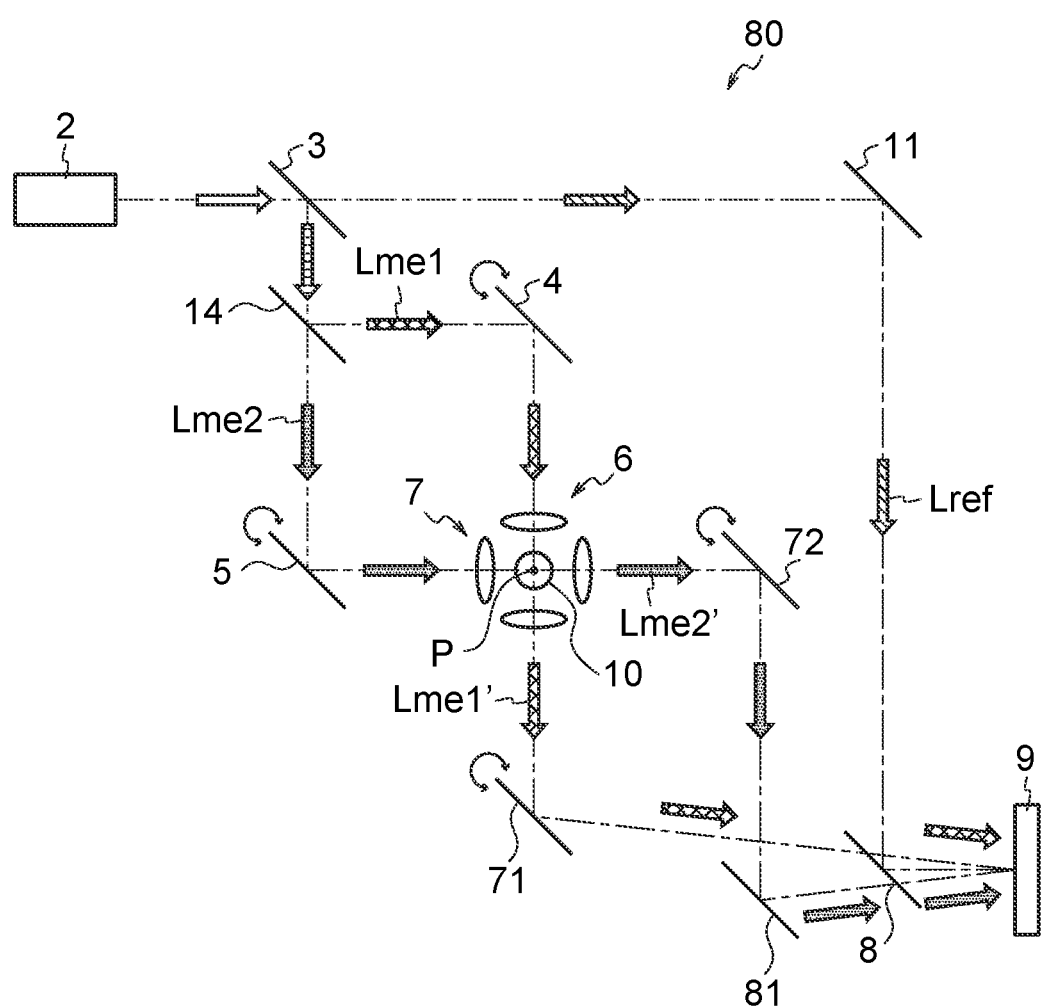
FIG. 14 is a diagram showing an example 5 of the data acquisition apparatus of the present embodiment.

An example 5 of the data acquisition apparatus of the present embodiment is shown in FIG. 14. Same reference numerals are assigned to components that are same as in the data acquisition apparatus 70, and description thereof is omitted.

The data acquisition apparatus 80 includes a mirror 81. The mirror 81 is disposed between the fourth light deflector 72 and the photodetector 9.

In the first measurement optical path OP1, the optical surface of the third light deflector 71 is positioned between the first measuring unit 6 and the photodetector 9. The optical surface of the third light deflector 71 is a mirror surface. The measurement light Lme1' reflected at the mirror surface enters the photodetector 9.

In the second measurement optical path OP2, the mirror 81 and the optical surface of the fourth light deflector 72 are positioned between the second measuring unit 7 and the photodetector 9. The optical surface of the fourth light deflector 72 is a mirror surface. The measurement light Lme2' reflected at the mirror surface, after being reflected at the mirror 81, enters the photodetector 9.

In the data acquisition apparatus 80, between the second beam splitter 8 and the photodetector 9, each of the first measurement optical path OP1 and the second measurement optical path OP2 is positioned nonparallel with respect to the reference optical path OPr. Whereas, in the data acquisition apparatus 70, between the second beam splitter 8 and the photodetector 9, each of the first measurement optical path OP1 and the second measurement optical path OP2 is positioned parallel with respect to the reference optical path OPr.

Therefore, the first interference fringe and the second interference fringe detected in the data acquisition apparatus 80 differ from the first interference fringe and the second interference fringe detected in the data acquisition apparatus 70. However, at the time of calculating the refractive index, by using an appropriate method of analyzing the interference fringe, even by using any of the interference fringe detected in the data acquisition apparatus 80 and the interference fringe detected by the data acquisition apparatus 70, it is possible to calculate the refractive index with high degree of accuracy.

Although it is omitted in the diagram, in the data acquisition apparatus 80, for instance, the abovementioned light shielding member 51 and the light shielding member 52 are disposed. Accordingly, in the data acquisition apparatus 80, it is possible to detect the first interference fringe and the second interference fringe separately.

The first interference fringe and the second interference fringe may be detected simultaneously. In the data acquisition apparatus 80, each of the first measurement optical path OP1 and the second measurement optical path OP2 intersect the reference optical path OPr. Moreover, the reference optical path OPr is positioned between the first measurement optical path OP1 and the second measurement optical path OP2. Accordingly, the first interference fringe differs from the second interference fringe.

In this case, even when the first interference fringe and the second interference fringe are detected to be overlapped, by using an appropriate method of analyzing the interference fringe, it is possible to separate the first interference fringe and the second interference fringe. Accordingly, in the data acquisition apparatus 80, the first interference fringe and the second interference fringe may be detected simultaneously.

In the data acquisition apparatus of the present embodiment, it is preferable that between the second beam splitter and the photodetector, each of the first measurement optical path and the second measurement optical path be positioned parallel to the reference optical path.

Figure 15:
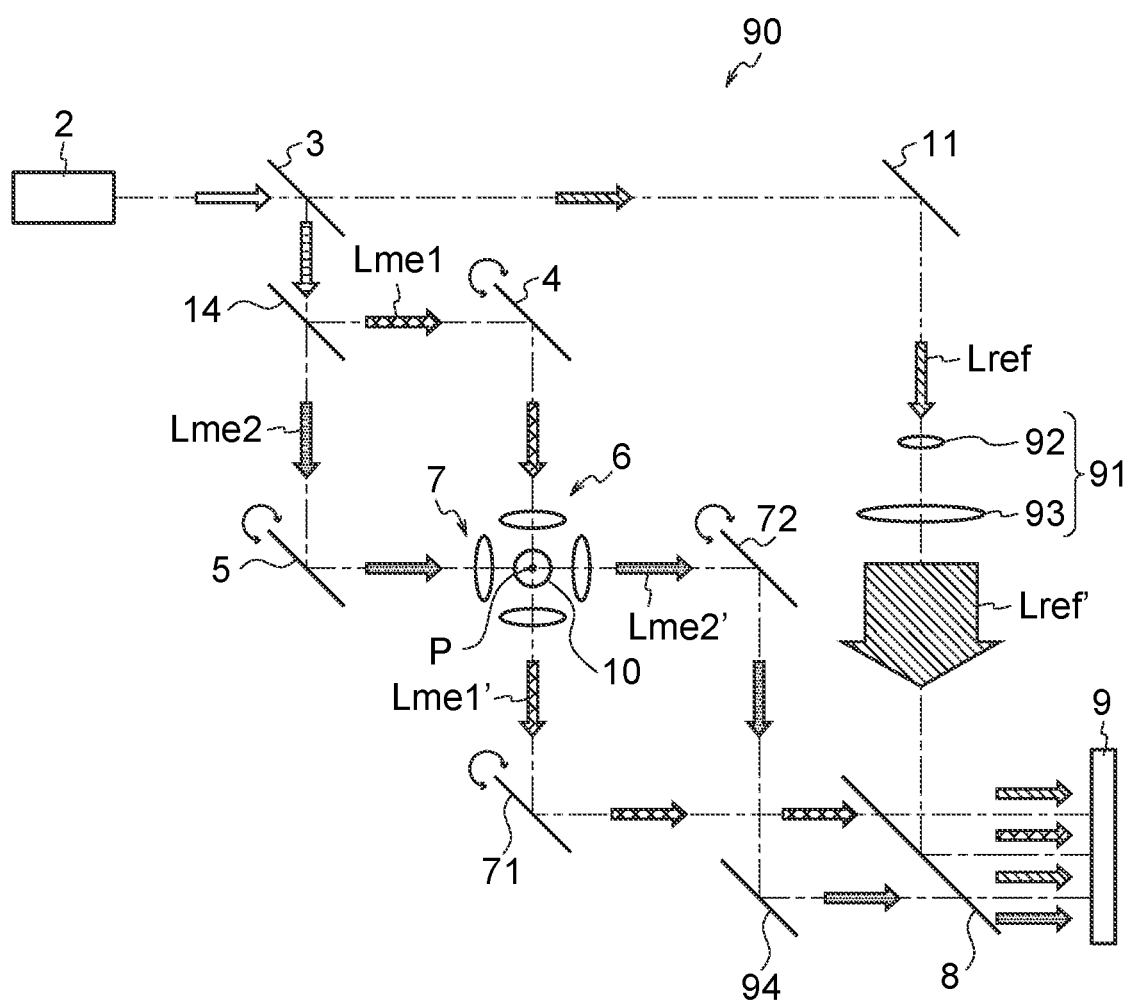
FIG. 15 is a diagram showing an example 6 of the data acquisition apparatus of the present embodiment.

An example 6 of the data acquisition apparatus of the present embodiment is shown in FIG. 15. Same reference numerals are assigned to components that are same as in the data acquisition apparatus 70, and description thereof is omitted.

A data acquisition apparatus 90 includes a beam expander 91 and a mirror 94. The beam expander 91 includes a lens 92 and a lens 93. The beam expander 91 is disposed between the mirror 11 and the second beam splitter 8.

In the beam expander 91, a beam diameter of the reference light Lref entered the beam expander 91 is enlarged. The reference light having the diameter enlarged (hereinafter, referred to as 'reference light Lref'') enters the second beam splitter 8.

In the data acquisition apparatus 90, between the second beam splitter 8 and the photodetector 9, each of the first measurement optical path OP1 and the second measurement optical path OP2 is positioned parallel with respect to the reference optical path OPr.

However, in the data acquisition apparatus 90, the mirror 94 is not positioned between the third light deflector 71 and the second beam splitter 8. Therefore, between the second beam splitter 8 and the photodetector 9, the first measurement optical path OP1 and the second measurement optical path OP2 are positioned in parallel.

In this case, at the second beam splitter 8, the measurement light Lme1' and the measurement light Lme2' pass different locations. However, the beam diameter of the reference light Lref' is enlarged enough to include the measurement light Lme1' and the measurement light Lme2'.

Accordingly, the first interference fringe is formed by the measurement light Lme1' and the reference light Lref', and the second interference fringe is formed by the measurement light Lme2' and the reference light Lref'. As a result, it is possible to detect the first interference fringe and the second interference fringe.

The measurement light Lme1' and the measurement light Lme2' being apart, the first interference fringe is formed at a location away from the second interference fringe. In the data acquisition apparatus 90, it is possible to detect the first interference fringe and the second interference fringe simultaneously and separately.

It is preferable that the data acquisition apparatus of the present embodiment include another light source which is different from the light source, and a wavelength band of light emitted from another light source differ from a wavelength band of light emitted from the light source.

Figure 16:
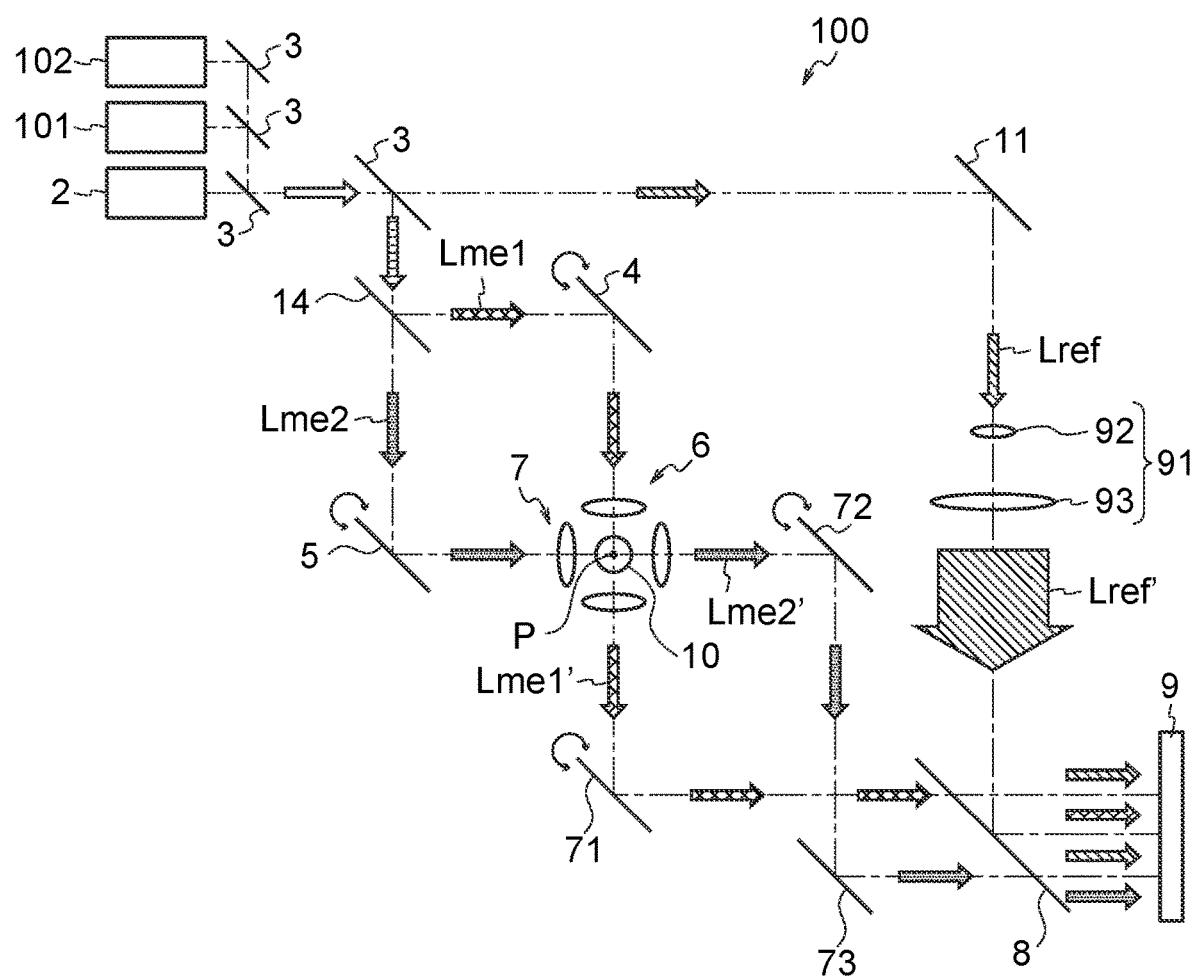
FIG. 16 is a diagram showing an example 7 of the data acquisition apparatus of the present embodiment.

An example 7 of the data acquisition apparatus of the present embodiment is shown in FIG. 16. Same reference numerals are assigned to components that are same as in the data acquisition apparatus 90, and description thereof is omitted.

A data acquisition apparatus 100 includes a light source 101 and a light source 102. Light of a wavelength band $\Delta\lambda 1$ is emitted from the light source 2 for instance. Light of a wavelength band $\Delta\lambda 2$ is emitted from the light source 101. Light of a wavelength band $\Delta\lambda 3$ is emitted from the light source 102.

At least a part of a wavelength of the wavelength band $\Delta\lambda 1$ is not included in the wavelength band $\Delta\lambda 2$. At least apart of a wavelength of the wavelength band $\Delta\lambda 2$ is not included in the wavelength band $\Delta\lambda 3$. At least a part of a wavelength of the wavelength band $\Delta\lambda 3$ is not included in the wavelength band $\Delta\lambda 1$.

In the data acquisition apparatus 100, regarding the first interference fringe, an interference fringe $\Delta\lambda 1$, an interference fringe $\Delta\lambda 2$, and an interference fringe $\Delta\lambda 3$ are detected. Even regarding the second interference fringe, the interference fringe $\Delta\lambda 1$, the interference fringe $\Delta\lambda 2$, and the interference fringe $\Delta\lambda 3$ are detected, similarly as for the first interference fringe.

The interference fringe $\Delta\lambda 1$ is an interference fringe in the wavelength band $\Delta\lambda 1$, the interference fringe $\Delta\lambda 2$ is an interference fringe in the wavelength band $\Delta\lambda 2$, and the interference fringe $\Delta\lambda 3$ is an interference fringe in the wavelength band $\Delta\lambda 3$.

The photodetector 9, for instance, has a plurality of minute light receiving portions. The plurality of light receiving portions is arranged two-dimensionally. A color filter may have been disposed in the photodetector 9. The color filter has a plurality of minute filter portions. The filter portions and the light receiving portions correspond one-to-one.

The plurality of filter portions includes, for example, a filter through which light of the wavelength band $\Delta\lambda 1$ is passed, a filter through which light of the wavelength band $\Delta\lambda 2$ is passed, and a filter through which light of the wavelength band $\Delta\lambda 3$ is passed. Filters of each color are disposed in a checkered pattern.

In a case in which color filters are disposed in the photodetector 9, it is possible to detect the interference fringe $\Delta\lambda 1$, the interference fringe $\Delta\lambda 2$, and the interference fringe $\Delta\lambda 3$ simultaneously.

In a case in which color filters are not disposed in the photodetector 9, for instance, the interference fringe $\Delta\lambda 1$ is detected by using light emitted from the light source 2, next, the interference fringe $\Delta\lambda 2$ is detected by using light emitted from the light source 101, and at the end, the interference fringe $\Delta\lambda 3$ is detected by using light emitted from the light source 102.

In the data acquisition apparatus 100, it is possible to calculate the refractive index in each wavelength band. Even in the data acquisition apparatus of the first embodiment, the data acquisition apparatus of the second embodiment, and the data acquisition apparatuses of the examples 1 to 7, it is possible to use a plurality of light sources. Moreover, the number of light sources is not restricted to three.

In the data acquisition apparatus of the present embodiment, it is preferable that light travelling along the first measurement optical path, light travelling along the second measurement optical path, and light travelling along the reference optical path be detected simultaneously by the photodetector.

It is possible to detect the first interference fringe and the second interference fringe simultaneously. Accordingly, it is possible to shorten the time taken for acquiring data.

It is preferable that the data acquisition apparatus of the present embodiment include a first polarizing element, a second polarizing element, and a third polarizing element, and the first polarizing element be disposed in the first measurement optical path, the second polarizing element be disposed in the second measurement optical path, the third polarizing element be disposed in the reference optical path, a direction of polarization of the first polarizing element and a direction of polarization of the second polarizing element differ, and a direction of polarization of the third polarizing element differ from both the direction of polarization of the first polarizing element and the direction of polarization of the second polarizing element.

Figure 17:
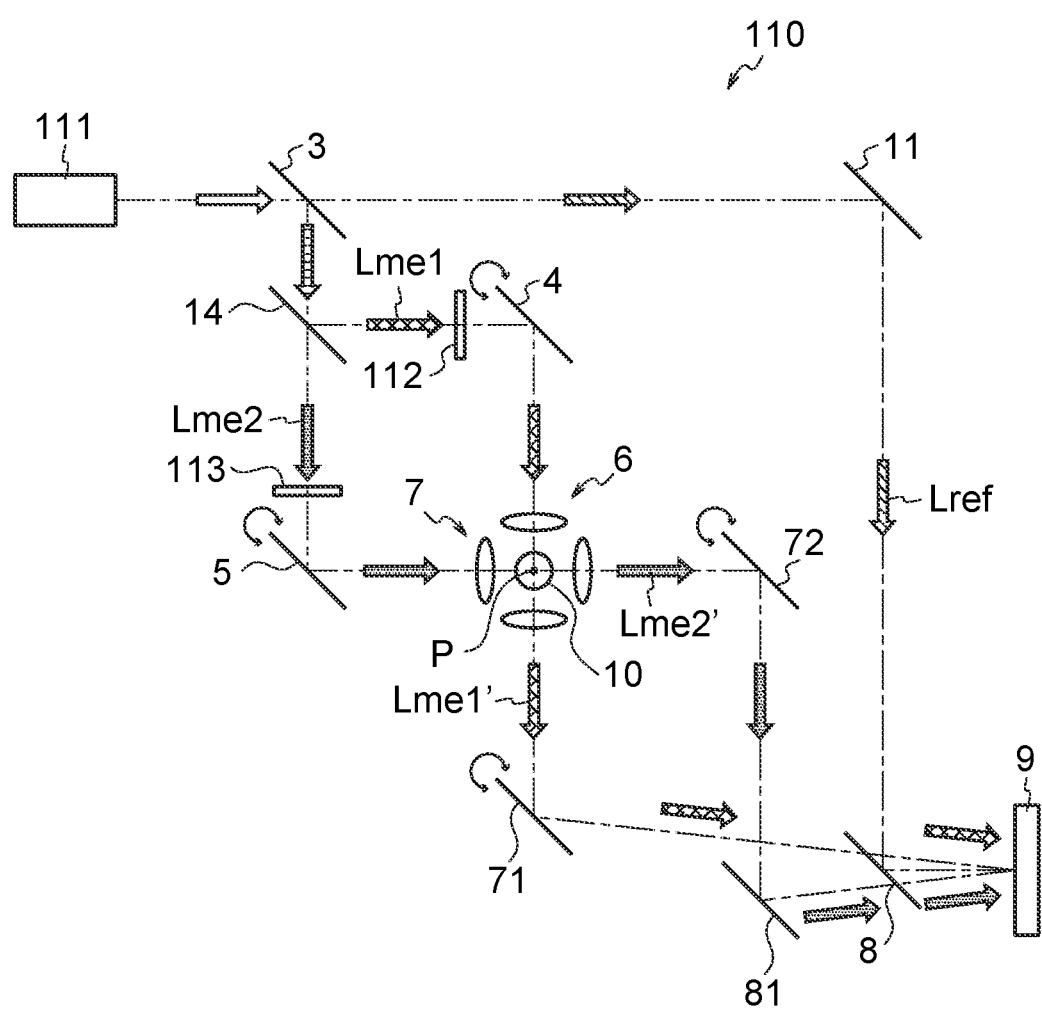
FIG. 17 is a diagram showing an example 8 of the data acquisition apparatus of the present embodiment.

An example 8 of the data acquisition apparatus of the present embodiment is shown in FIG. 17. Same reference numerals are assigned to components that are same as in the data acquisition apparatus 80, and description thereof is omitted.

A data acquisition apparatus 110 includes a light source 111, a polarizing element 112, and a polarizing element 113. The light source 111 emits linearly polarized light. The polarizing element 112 is disposed in the first measurement optical path OP1. The polarizing element 113 is disposed in the second measurement optical path OP2.

A direction of polarization of light emerged from the polarizing element 112 is rotated through +45 degrees for example, with respect to a direction of polarization of light emitted from the light source 111. A direction of polarization of light emerged from the polarizing element 113 is rotated through −45 degrees for example, with respect to the direction of polarization of light emitted from the light source 111. Accordingly, the direction of polarization of light emerged from the polarizing element 113 is orthogonal to the direction of polarization of light emerged from the polarizing element 112.

Light emerged from the polarizing element 112 is measurement light Lme1. Light emerged from the polarizing element 113 is measurement light Lme2. When the measurement light Lme1 is S-polarized light, the measurement light Lme2 becomes P-polarized light.

Reference light Lref is linearly polarized light emitted from the light source 111. In this case, it is possible to divide the linearly polarized light of the reference light Lref into an S-polarized component and a P-polarized component. As a result, a first interference fringe is generated by measurement light Lme1' and the reference light Lref, and a second interference fringe is generated by measurement light Lme2' and the reference light Lref.

In the data acquisition apparatus 110, it is possible to detect the first interference fringe and the second interference fringe simultaneously. Accordingly, it is possible to shorten the time taken for acquiring data.

In the data acquisition apparatus of the present embodiment, it is preferable that each of the first light deflector and the second light deflector have an optical surface, and the optical film be formed on at least one of the optical surface of the first light deflector and the optical surface of the second light deflector.

As shown in FIG. 1, a location common to the reference optical path OPr and the first measurement optical path OP1 is formed. Accordingly, it is possible to reduce the size of the apparatus.

In the data acquisition apparatus of the present embodiment, it is preferable that a third measurement optical path be positioned between the light source and the photodetector, and the third measurement optical path intersect both the first measurement optical path and the second measurement optical path.

Figure 18:
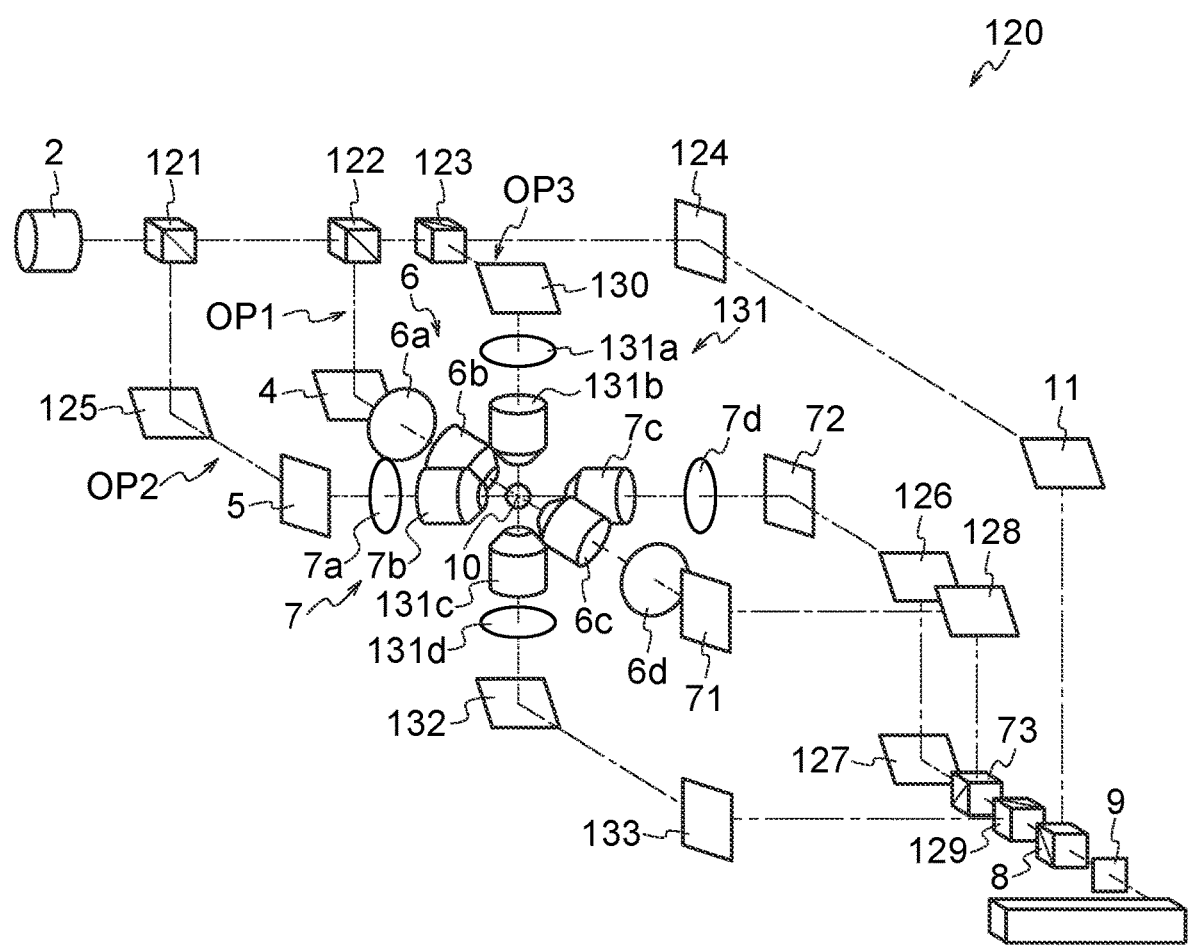
FIG. 18 is a diagram showing an example 9 of the data acquisition apparatus of the present embodiment.

An example 9 of the data acquisition apparatus of the present embodiment is shown in FIG. 18. Same reference numerals are assigned to components that are same as in the data acquisition apparatus 70, and description thereof is omitted.

In a data acquisition apparatus 120, a third measurement optical path OP3 is positioned between the light source 2 and the photodetector 9, and the third measurement optical path OP3 intersects both the first measurement optical path OP1 and the second measurement optical path OP2.

A beam splitter 121, a beam splitter 122, a beam splitter 123, and a mirror 124 are disposed between the light source 2 and the mirror 11. Each of the beam splitter 121, the beam splitter 122, and the beam splitter 123 has an optical surface on which an optical film is formed. From an incident light, light travelling toward the transmission side and light travelling toward the reflection side are generated by the optical film.

A part of light emerged from the light source 2 passes through the beam splitter 121, the beam splitter 122, and the beam slitter 123. The reference optical path OPr is positioned on the transmission side of the beam splitter 123. Light passed through the beam splitter 123 is the reference light Lref.

The reference light Lref, after being reflected at the mirror 124 and the mirror 11, enters the second beam splitter 8. At the second beam splitter 8, a part of the reference light is reflected by the optical film and the remaining light passes through the optical film. The reference light Lref reflected at the second beam splitter 8 enters the photodetector 9.

A part of light emitted from the light source 2 is reflected at the beam splitter 121. The second measurement optical path OP2 is positioned on the reflection side of the beam splitter 121. A mirror 125, a mirror 126, and a mirror 127 are disposed in the second measurement optical path OP2.

Light reflected at the beam splitter 121 is measurement light Lme2. The measurement light Lme2 is reflected at the mirror 125, and enters the second light deflector 5. The measurement light Lme2 is reflected at the second light deflector 5, and enters the second measuring unit 7.

Measurement light Lme2' emerges from the second measuring unit 7. The measurement light Lme2' is reflected at the fourth light deflector 72, the mirror 126, and the mirror 127. The Lme2' reflected at the mirror 127 enters the beam splitter 73.

Apart of light transmitted through the beam splitter 121 is reflected at the beam splitter 122. The first measurement optical path OP1 is positioned on the reflection side of the beam splitter 122. A mirror 128 is disposed in the first measurement optical path OP1.

Light reflected at the beam splitter 122 is measurement light Lme1. The measurement light Lme1 enters the first light deflector 4. The measurement light Lme1 is reflected at the first light deflector 4, and enters the first measuring unit 6.

Measurement light Lme1' emerges from the first measuring unit 6. The measurement light Lme1' is reflected at the third light deflector 71 and the mirror 128. The measurement light Lme1' reflected at the mirror 128 enters the beam splitter 73.

At the beam splitter 73, a part of the measurement light Lme1' and a part of the measurement light Lme2' are reflected by the optical film and the remaining light passes through the optical film. The measurement light Lme1' reflected at the beam splitter 73 and the measurement light Lme2' passed through the beam splitter 73 are enter a beam splitter 129.

The beam splitter 129 has an optical surface on which an optical film is formed. From an incident light, light travelling toward the transmission side and light travelling toward the reflection side are generated by the optical film. At the beam splitter 129, apart of the measurement light Lme1' and the measurement light Lme2' is reflected by the optical film and the remaining light passes through the optical film.

The measurement light Lme1' and the measurement light Lme2' passed through the beam splitter 129 enter the second beam splitter 8.

Apart of the light passed through the beam splitter 122 is reflected at the beam splitter 123. The third measurement optical path OP3 is positioned on the reflection side of the beam splitter 123. A fifth light deflector 130, a third measuring unit 131, a sixth light deflector 132, and a mirror 133 are disposed in the third measurement optical path OP3.

The third measuring unit 131 includes a third illuminating optical system and a third detecting optical system. The third illuminating optical system includes an imaging lens 131*a* and an objective lens 131*b*. The third detecting optical system includes an objective lens 131*c* and an imaging lens 131*d*.

The third measurement optical path OP3 intersects both the first measurement optical path OP1 and the second measurement optical path OP2. The sample 10 is positioned at a point of intersection of the first measurement optical path OP1, the second measurement optical path OP2, and the third measurement optical path OP3. In the third measuring unit 131, the third illuminating optical system and the third detecting optical system face each other across the point of intersection.

Light reflected at the beam splitter 123 is measurement light Lme3. The measurement light Lme3 enters the fifth light deflector 130. The measurement light Lme3 is reflected at the fifth light deflector 130 and enters the third measuring unit 131.

Measurement light Lme3' emerges from the third measuring unit 131. The measurement light Lme3' is reflected at the sixth light deflector 132 and the mirror 133. The measurement light Lme3' reflected at the mirror 133 enters the beam splitter 129.

At the beam splitter 129, a part of the measurement light Lme3' is reflected by the optical film and the remaining light passes through the optical film. The measurement light Lme3' reflected at the beam splitter 129 enters the second beam splitter 8.

The measurement light Lme1', the measurement light Lme2', the measurement light Lme3', and the reference light Lref enter the second beam splitter 8. A part of those lights emerges from the second beam splitter 8. Light emerged from the second beam splitter 8 enters the photodetector 9.

The measurement light Lme1', the measurement light Lme2', the measurement light Lme3', and the reference light Lref enter the photodetector 9. As a result, it is possible to detect the first interference fringe, the second interference fringe, and the third interference fringe. The third interference fringe is an interference fringe formed by the measurement light Lme3' and the reference light Lref.

In the data acquisition apparatus 120, it is possible to acquire a scattering potential on the fx-axis, a scattering potential on the fy-axis, and a scattering potential on the fz-axis. As a result, it is possible to calculate the refractive index with even higher degree of accuracy.

In the data acquisition apparatus of the present embodiment, it is preferable that at least one of the first measuring unit and the second measuring unit include a container which holds a sample.

Figure 19A:
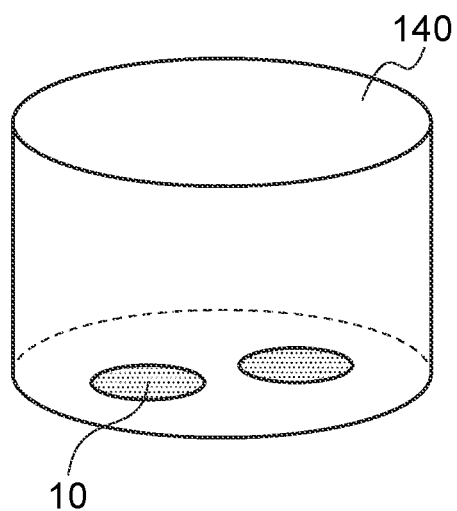
FIG. 19A and FIG. 19B are diagrams showing a container which holds a sample.
Figure 19B:
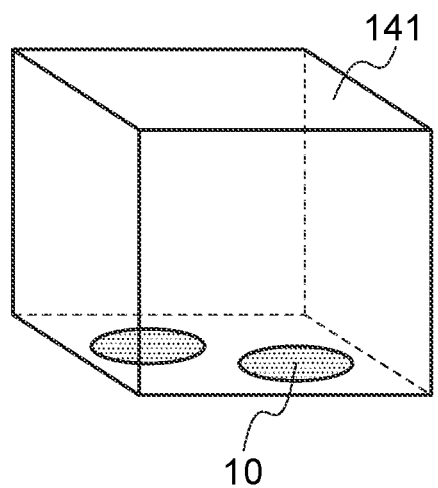

A container holding a sample is shown in FIG. 19A and FIG. 19B. FIG. 19A is a diagram showing a first example of the container and FIG. 19B is a diagram showing a second example of the container.

In the first example, a shape of a container 140 is a circular cylindrical shape. In the second example, a shape of a container 141 is a rectangular pillar shape. The shape of the container may be other shape.

Figure 20A:
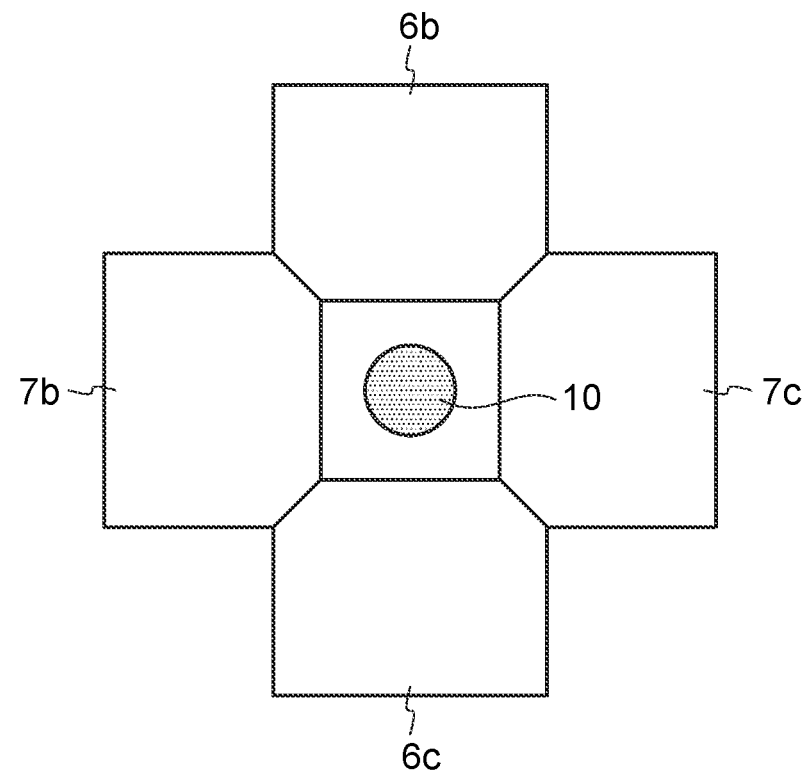
FIG. 20A and FIG. 20B are diagrams showing a relationship of a measuring unit and a container which holds a sample.
Figure 20B:
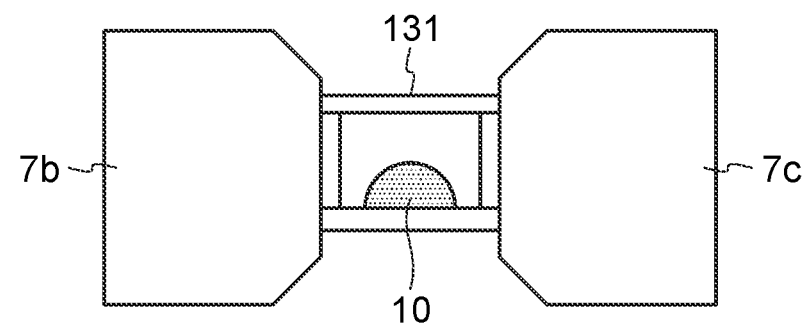

A relationship of the measuring unit and the container holding the sample is shown in FIG. 20A and FIG. 20B. FIG. 20A is a top view, and FIG. 20B is a side view.

When the shape of the container holding the sample is a rectangular pillar shape, holding the container in the measuring unit becomes easy. In FIG. 20A, the container 141 is held by the first measuring unit 6 and the second measuring unit 7. The shape of the container 141 being a rectangular pillar shape, it is possible to hold the container 141 easily.

The container 141 is sandwiched between the objective lens 6b and the objective lens 6c. Moreover, the container 141 is sandwiched between the objective lens 7b and the objective lens 7c. The container 141 is held by the objective lens 6b, the objective lens 6c, the objective lens 7b, and the objective lens 7c.

The container 141 may be held only by the first measuring unit 6. Or, the container 141 may be held only by the second measuring unit 7. In a case in which the third measuring unit 131 is disposed, the container 141 may be held only by the third measuring unit 131.

In the data acquisition apparatus of the present embodiment, it is preferable that each of the first measuring unit and the second measuring unit have a pair of objective lenses, the pair of objective lenses include an illuminating-side objective lens and an imaging-side objective lens, and the following conditional expression (1) be satisfied:

$$\pi/2 < \sin^{-1}NA1 + \sin^{-1}NA2 \quad (1)$$

where,

NA1 denotes a numerical aperture of the illuminating-side objective lens, and

NA2 denotes a numerical aperture of the imaging-side objective lens.

In a case of satisfying conditional expression (1), OTF of an optical system in the first measuring unit and OTF of an optical system in the second measuring unit overlap.

In the data acquisition apparatus of the present embodiment, it is preferable that each of the first measuring unit and the second measuring unit have a pair of objective lenses, the pair of objective lenses include an illuminating-side objective lens and an imaging-side objective lens, a numerical aperture of the illuminating-side objective lens and a numerical aperture of the imaging-side objective lens be identical, and the following conditional expression (2) be satisfied:

$$0.71 < NA \quad (2)$$

where,

NA denotes a numerical aperture of the illuminating-side objective lens.

In a case of satisfying conditional expression (2), OTF of the optical system in the first measuring unit and OTF of the optical system in the second measuring unit overlap.

It is preferable that a data acquisition apparatus of the present embodiment include a computing unit, the computing unit determine the scattering potential of a sample from data acquired in the first measurement optical path and data acquired in the second measurement optical path, and calculate the refractive-index distribution in the sample on the basis of the scattering potential of the sample.

It is preferable that the data acquisition apparatus of the present embodiment include a computing unit, the light source include a plurality of light sources of different wavelength bands, and emits light of a plurality of wavelength bands, light having one of the plurality of wavelength bands enter the sample in each of the plurality of sample optical paths, and the computing unit calculate the refractive-index distribution of the sample for each of the plurality of wavelength bands.

According to the present disclosure, it is possible to provide a data acquisition apparatus in which the refractive index can be calculated with a high degree of accuracy.

As mentioned heretofore, the present disclosure is useful for a data acquisition apparatus in which the refractive index can be calculated with a high degree of accuracy.

What is claimed is:

1. A data acquisition apparatus comprising:
a light source;
a first beam splitter;
a predetermined beam splitter;
a first light deflector;
a second light deflector;
a first measuring unit;
a second measuring unit;
a second beam splitter; and
a photodetector, wherein
a first measurement optical path, a second measurement optical path, and a reference optical path are positioned between the light source and the photodetector,
each of the first beam splitter, the predetermined beam splitter, and the second beam splitter has an optical surface on which an optical film is formed,
at the first beam splitter, from an incident light, light travelling in a first direction and light travelling in a second direction are generated by the optical film,
the second measurement optical path is positioned in the first direction,
the reference optical path is positioned in the second direction,
the predetermined beam splitter is disposed in the second measurement optical path or the reference optical path,
the first measurement optical path is positioned between the predetermined beam splitter and the photodetector,
the first light deflector and the first measuring unit are disposed in the first measurement optical path,
the second light deflector and the second measuring unit are disposed in the second measurement optical path, and
the first measurement optical path and the second measurement optical path intersect.

2. The data acquisition apparatus according to claim 1, wherein
the predetermined beam splitter is disposed in the second measurement optical path,
the first measurement optical path is positioned on a reflection side of the predetermined beam splitter, and
the second measurement optical path is positioned on a transmission side of the predetermined beam splitter.

3. The data acquisition apparatus according to claim 1, wherein
the predetermined beam splitter is disposed in the reference optical path,
the first light deflector has the predetermined beam splitter, the reference optical path is positioned on a transmission side of the predetermined beam splitter, and the first measurement optical path is positioned on a reflection side of the predetermined beam splitter.

4. The data acquisition apparatus according to claim 1, wherein each of an optical surface of the first light deflector and an optical surface of the second light deflector is conjugate with a point of intersection of the first measurement optical path and the second measurement optical path, and each of the first light deflector and the second light deflector is a galvanometer scanner.

5. The data acquisition apparatus according to claim 1, comprising:

a third light deflector; and a fourth light deflector, wherein the third light deflector is disposed between the first measuring unit and the photodetector, the fourth light deflector is disposed between the second measuring unit and the photodetector, each of an optical surface of the third light deflector and an optical surface of the fourth light deflector is conjugate with a point of intersection of the first measurement optical path and the second measurement optical path, and each of the third light deflector and the fourth light deflector is a galvanometer scanner.

6. The data acquisition apparatus according to claim 1, wherein between the second beam splitter and the photodetector, each of the first measurement optical path and the second measurement optical path is positioned parallel to the reference optical path.

7. The data acquisition apparatus according to claim 1, comprising:

another light source which is different from the light source, wherein a wavelength band of light emitted from another light source differs from a wavelength band of light emitted from the light source.

8. The data acquisition apparatus according to claim 1, wherein light travelling along the first measurement optical path, light travelling along the second measurement optical path, and light travelling along the reference optical path are detected simultaneously by the photodetector.

9. The data acquisition apparatus according to claim 1, comprising:

a first polarizing element;

a second polarizing element; and a third polarizing element, wherein the first polarizing element is disposed in the first measurement optical path, the second polarizing element is disposed in the second measurement optical path, the third polarizing element is disposed in the reference optical path, a direction of polarization of the first polarizing element and a direction of polarization of the second polarizing element differ, and a direction of polarizing of the third polarizing element differ from both the direction of polarization of the first polarizing element and the direction of polarization of the second polarizing element.

10. The data acquisition apparatus according to claim 1, wherein each of the first light deflector and the second light deflector has an optical surface, and the optical film is formed on at least one of the optical surface of the first light deflector and the optical surface of the second light deflector.

11. The data acquisition apparatus according to claim 1, wherein a third measurement optical path is positioned between the light source and the photodetector, and the third measurement optical path intersects both the first measurement optical path and the second measurement optical path.

12. The data acquisition apparatus according to claim 1, wherein at least one of the first measuring unit and the second measuring unit includes a container which holds a sample.

13. The data acquisition apparatus according to claim 1, wherein each of the first measuring unit and the second measuring unit has a pair of objective lenses, the pair of objective lenses includes an illuminating-side objective lens and an imaging-side objective lens, and the following conditional expression (1) is satisfied:

$$\pi/2 < \sin^{-1} NA1 + \sin^{-1} NA2 \qquad (1)$$

where,

NA1 denotes a numerical aperture of the illuminating-side objective lens, and

NA2 denotes a numerical aperture of the imaging-side objective lens.

14. The data acquisition apparatus according to claim 1, wherein each of the first measuring unit and the second measuring unit has a pair of objective lenses, the pair of objective lenses includes an illuminating-side objective lens and an imaging-side objective lens, a numerical aperture of the illuminating-side objective lens and a numerical aperture of the imaging-side objective lens are identical, and the following conditional expression (2) is satisfied:

$$0.71 < NA \qquad (2)$$

where,

NA denotes a numerical aperture of the illuminating-side objective lens.

* * * * *